(12) United States Patent
Nakae et al.

(10) Patent No.: US 12,224,135 B2
(45) Date of Patent: Feb. 11, 2025

(54) INPUT SYSTEM AND CONTROL METHOD

(71) Applicant: Panasonic Intellectual Property Management Co., Ltd., Osaka (JP)

(72) Inventors: Ryo Nakae, Okayama (JP); Yasunori Yanai, Okayama (JP); Takehiko Nara, Okayama (JP); Yuta Saito, Okayama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 149 days.

(21) Appl. No.: 18/040,263

(22) PCT Filed: Aug. 3, 2021

(86) PCT No.: PCT/JP2021/028702
§ 371 (c)(1),
(2) Date: Feb. 1, 2023

(87) PCT Pub. No.: WO2022/064859
PCT Pub. Date: Mar. 31, 2022

(65) Prior Publication Data
US 2023/0290591 A1    Sep. 14, 2023

(30) Foreign Application Priority Data

Sep. 24, 2020    (JP) ................................ 2020-160071

(51) Int. Cl.
*H01H 25/04*    (2006.01)
*H01H 13/64*    (2006.01)

(52) U.S. Cl.
CPC .......... *H01H 25/041* (2013.01); *H01H 13/64* (2013.01)

(58) Field of Classification Search
CPC .. H01H 1/12; H01H 3/00; H01H 3/02; H01H 3/12; H01H 9/00; H01H 9/0044;
(Continued)

(56) References Cited

U.S. PATENT DOCUMENTS

| 2004/0104727 A1 | 6/2004 | Morimoto |
| 2005/0057266 A1 | 3/2005 | Morimoto |

(Continued)

FOREIGN PATENT DOCUMENTS

| JP | 2004-045243 | 2/2004 |
| JP | 2004-191348 | 7/2004 |

(Continued)

OTHER PUBLICATIONS

International Search Report of PCT application No. PCT/JP2021/028702 dated Oct. 5, 2021.

*Primary Examiner* — Anthony R Jimenez
(74) *Attorney, Agent, or Firm* — Rimon P.C.

(57) ABSTRACT

This input system includes an input device, an electrostatic sensor, a conduction sensor, a controller, and a determiner. When a movable contact of the input device is pressed, electrostatic capacitance between a first electrode and a second electrode changes, and when the movable contact of the input device is further pressed after the electrostatic capacitance changes, a third electrode and a fourth electrode are electrically conductive to each other. The conduction sensor detects the conduction between the third electrode and the fourth electrode. The controller switches the sensing operation of the electrostatic sensor from the OFF state to the ON state after the conduction sensor detects the conduction between the third electrode and the fourth electrode. In the ON state, the electrostatic sensor outputs a detected value related to the electrostatic capacitance between the first electrode and the second electrode.

16 Claims, 8 Drawing Sheets

(58) Field of Classification Search
CPC ...... H01H 9/02; H01H 9/0214; H01H 9/0235; H01H 9/16; H01H 9/161; H01H 9/167; H01H 9/18; H01H 9/181; H01H 9/182; H01H 13/00; H01H 13/04; H01H 13/14; H01H 13/26; H01H 13/50; H01H 13/705; H01H 13/86; H01H 2003/00; H01H 2003/007; H01H 2003/12; H01H 2221/044; H01H 2223/00; H01H 2223/002; H01H 2223/003; H01H 2223/04; H01H 2300/022
USPC .................................................. 361/832, 837
See application file for complete search history.

(56) References Cited

U.S. PATENT DOCUMENTS

| | | |
|---|---|---|
| 2020/0290566 A1 | 9/2020 | Yamazaki |
| 2021/0165498 A1 | 6/2021 | Saito et al. |

FOREIGN PATENT DOCUMENTS

| | | |
|---|---|---|
| JP | 2007-173068 A | 7/2007 |
| JP | 2009-272043 | 11/2009 |
| JP | 2012-190694 A | 10/2012 |
| WO | 2017/082372 A1 | 5/2017 |
| WO | 2019/230510 | 12/2019 |

INPUT SYSTEM AND CONTROL METHOD

CROSS-REFERENCE TO RELATED APPLICATIONS

This application is a U.S. national stage application of the PCT International Application No. PCT/JP2021/028702 filed on Aug. 3, 2021, which claims the benefit of foreign priority of Japanese patent application No. 2020-160071 filed on Sep. 24, 2020, the contents all of which are incorporated herein by reference.

TECHNICAL FIELD

The present disclosure generally relates to input systems and control methods and more particularly relates to an input system including an electrostatic capacitive input device and a method for controlling the input system.

BACKGROUND ART

Patent Literature (PTL 1) discloses an input apparatus. This input apparatus includes a first pressure detector, a second pressure detector, and a click detector. The first and second pressure detectors detect a pressing force that acts on a pressing surface. The click detector detects elastic deformation (generation of a click feel) of a clicking part. Each of the first and second pressure detectors and the click detector is an electrostatic capacitive pressure sensor.

CITATION LIST

Patent Literature

PTL 1: International Publication No. WO2019/230510

SUMMARY OF THE INVENTION

The input apparatus (input device) is connected to a control system, and the control system detects (monitors) a change in the state of the input apparatus on the basis of output from the input apparatus. The control system may include an electrostatic sensor that is connected to the aforementioned pressure sensor and performs a sensing operation (application of a voltage to an electrode of the pressure sensor) to detect a change in the electrostatic capacitance of the pressure sensor. In this case, in order to monitor a change in the state, the control system needs to always keep the electrostatic sensor ON to perform the sensing operation, resulting in concerns about an increase in the power consumption of the electrostatic sensor.

An input system according to one aspect of the present disclosure includes an input device, an electrostatic sensor, a conduction sensor, a controller, and a determiner. The input device includes a movable contact, a first electrode, a second electrode, a third electrode, and a fourth electrode. The electrostatic sensor is connected to the first electrode. The conduction sensor is connected to the third electrode. The controller is configured to switch a sensing operation of the electrostatic sensor between an ON state and an OFF state. The determiner is connected to the electrostatic sensor and is configured to determine, based on output from the electrostatic sensor, whether the movable contact is pressed. When the movable of the input device contact is pressed, electrostatic capacitance between the first electrode and the second electrode changes, when the movable contact of the input device is further pressed after the electrostatic capacitance changes, the third electrode and the fourth electrode are electrically conductive to each other. The conduction sensor detects the conduction between the third electrode and the fourth electrode. The controller is configured to switch the sensing operation of the electrostatic sensor from the OFF state to the ON state after the conduction sensor detects the conduction between the third electrode and the fourth electrode. In the ON state, the electrostatic sensor outputs a detected value related to the electrostatic capacitance between the first electrode and the second electrode. The detected value output by the electrostatic sensor is input to the determiner.

A control method according to one aspect of the present disclosure is a control method for an input system. The input system includes an input device, an electrostatic sensor, a conduction sensor, a controller, and a determiner. The input device includes a movable contact, a first electrode, a second electrode, a third electrode, and a fourth electrode. The electrostatic sensor is connected to the first electrode. The conduction sensor is connected to the third electrode. The controller is configured to switch a sensing operation of the electrostatic sensor to an ON state or an OFF state. The determiner is connected to the electrostatic sensor and is configured to determine, based on output from the electrostatic sensor, whether the movable contact has been pressed. When the movable contact of the input device is pressed, electrostatic capacitance between the first electrode and the second electrode changes, when the movable contact of the input device is further pressed after the electrostatic capacitance changes, the third electrode and the fourth electrode are electrically conductive to each other. The control method includes the step of detecting conduction, the step of switching, the step of detecting electrostatic capacitance, and the step of inputting. In the step of detecting conduction, the controller causes the conduction sensor to detect the conduction between the third electrode and the fourth electrode. In the step of switching, the controller switches the sensing operation of the electrostatic sensor from the OFF state to the ON state after the conduction sensor detects the conduction between the third electrode and the fourth electrode. In the step of detecting electrostatic capacitance, the controller causes the electrostatic sensor to output a detected value related to the electrostatic capacitance between the first electrode and the second electrode after switching the sensing operation of the electrostatic sensor from the OFF state to the ON state. In the step of inputting, the controller causes the detected value output by the electrostatic sensor to be input to the determiner.

The present disclosure provides the advantage of enabling a reduction in the power consumption of the electrostatic sensor.

DESCRIPTION OF EMBODIMENTS (1) Outline

Each figure described in the following exemplary embodiment is a schematic diagram, meaning that the ratio between the sizes of structural elements in each figure and the ratio between the thicknesses of structural elements in each figure do not necessarily reflect actual dimension ratios.

Input system 1 according to one aspect of the present exemplary embodiment can be applied, for example, to various electrical devices such as mobile information terminals, in-vehicle devices, home appliances, and video game consoles. Input device 100 included in input system 1 is used as an operation unit that receives input (a pressing operation).

Figure 1:
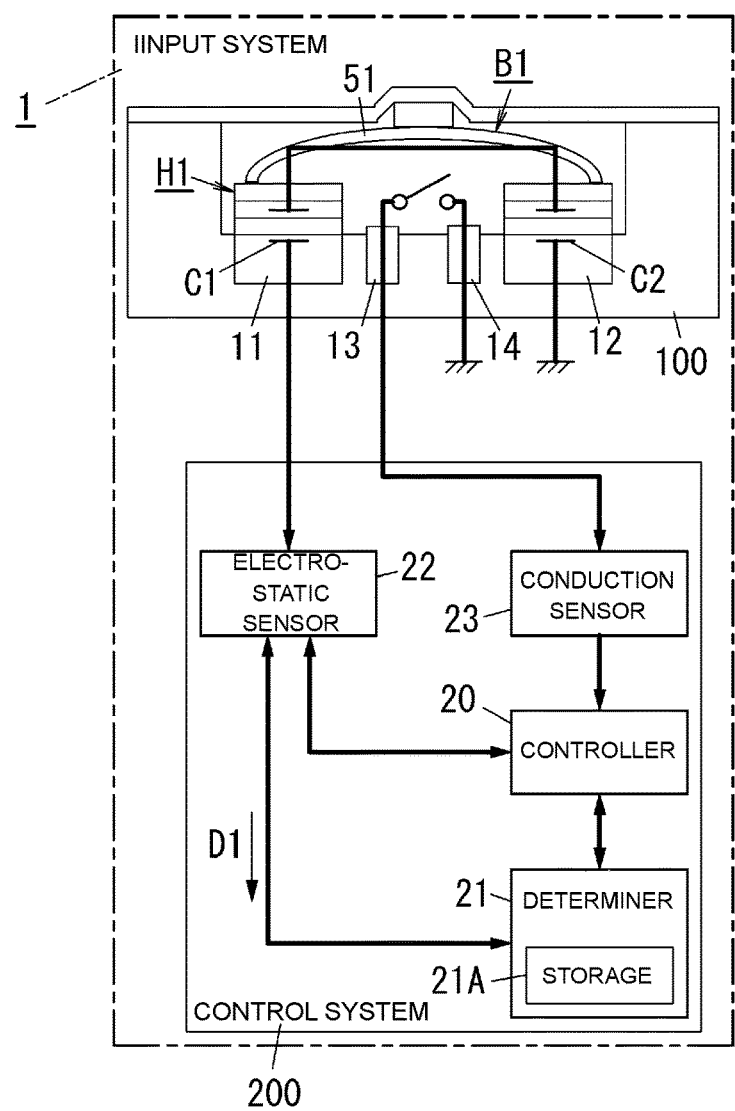
FIG. 1 is a schematic configuration diagram of the entire input system according to one exemplary embodiment.

Input system 1 includes input device 100, electrostatic sensor 22, conduction sensor 23, controller 20, and determiner 21, as illustrated in FIG. 1. As one example, electrostatic sensor 22, conduction sensor 23, controller 20, and determiner 21 constitute control system 200 (refer to FIG. 1).

Input device 100 is mounted on a printed board, for example, and in this state is installed in the casing of an electrical device. In this case, for example, an operation button is disposed on the casing in a position corresponding to input device 100. Thus, when a user of input device 100 presses the operation button with the tip of his or her finger or an operation member or the like held in his or her hand (hereinafter referred to simply as a "fingertip" for convenience of description), input device 100 is indirectly operated via the operation button. Control system 200 is electrically connected to input device 100. At least a portion of control system 200 may be mounted on the printed board on which input device 100 is mounted or may be mounted on a printed board different from said printed board. Alternatively, at least a portion of control system 200 may be provided external to the casing of the electrical device.

Figure 3:
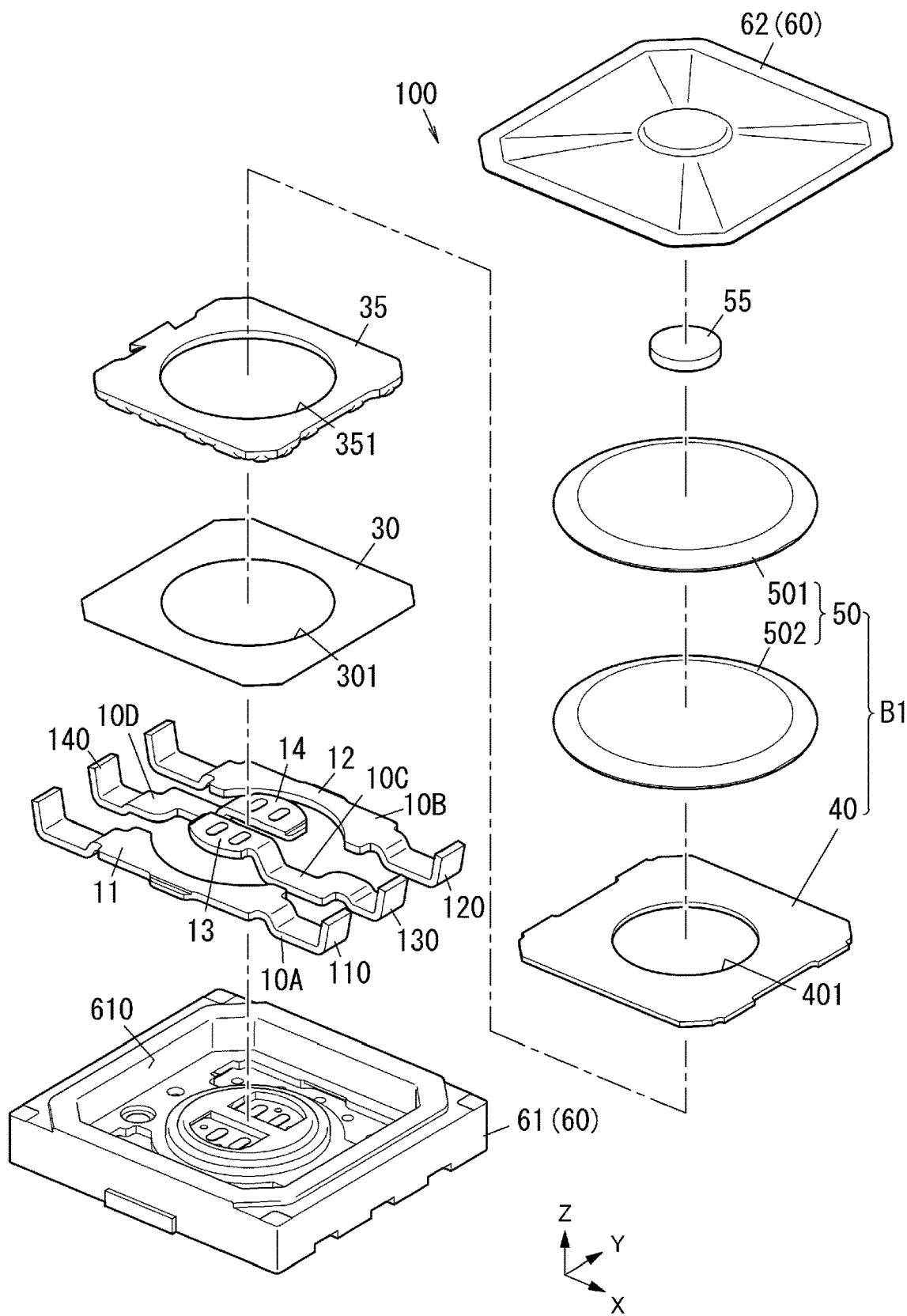
FIG. 3 is an exploded perspective view of the input device.

Input device 100 includes movable contact B1, first electrode 11, second electrode 12, third electrode 13, and fourth electrode 14, as illustrated in FIG. 1 and FIG. 3.

Electrostatic sensor 22 is connected to first electrode 11. For example, electrostatic sensor 22 is electrically connected to first electrode 11 via a conductor pattern or the like on the aforementioned printed board on which input device 100 is mounted.

Conduction sensor 23 is connected to third electrode 13. For example, conduction sensor 23 is connected to third electrode 13 via a conductor pattern or the like on the aforementioned printed board on which input device 100 is mounted.

Controller 20 switches the sensing operation of electrostatic sensor 22 to the ON state or the OFF state. Determiner 21 is connected to electrostatic sensor 22 and determines, on the basis of output from electrostatic sensor 22, whether movable contact B1 has been pressed.

Input device 100 is configured such that when movable contact B1 is pressed, electrostatic capacitance between first electrode 11 and second electrode 12 changes, and when movable contact B1 is further pressed after the electrostatic capacitance changes, third electrode 13 and fourth electrode 14 conduct electricity therebetween. In other words, input device 100 has a structure such that when an external pressing operation is performed thereon, the electrostatic capacitance between first electrode 11 and second electrode 12 can change before third electrode 13 and fourth electrode 14 conduct electricity therebetween. The "pressing operation" is performed, for example, by a user pressing the operation button on the casing with a fingertip.

Conduction sensor 23 detects the conduction between third electrode 13 and fourth electrode 14. After conduction sensor 23 detects the conduction between third electrode 13 and fourth electrode 14, controller 20 switches the sensing operation of electrostatic sensor 22 from the OFF state to the ON state. In the ON state, electrostatic sensor 22 outputs detected value D1 related to the electrostatic capacitance between first electrode 11 and second electrode 12. Detected value D1 output by electrostatic sensor 22 is input to determiner 21. Hereinafter, an operation mode of input system 1 in which the sensing operation of electrostatic sensor 22 is in the ON state and detected value D1 can be output (detected) may be referred to as a "normal mode". Furthermore, hereinafter, an operation mode of input system 1 in which the sensing operation of electrostatic sensor 22 is in the OFF state and detected value D1 is not output (detected) may be referred to as a "power-saving mode". The electric power consumed by electrostatic sensor 22 is greater in the normal mode than in the power-saving mode.

With this configuration, after conduction sensor 23 detects the conduction between third electrode 13 and fourth electrode 14, controller 20 switches the sensing operation of electrostatic sensor 22 from the OFF state to the ON state. This means that the sensing operation of electrostatic sensor 22 remains in the OFF state at least until conduction sensor 23 detects the conduction. As a result, the power consumption of electrostatic sensor 22 can be reduced.

A control method according to another aspect of the present exemplary, embodiment is a control method for input system 1. This control method includes the step of detecting conduction, the step of switching, the step of detecting electrostatic capacitance, and the step of inputting. In the step of detecting conduction, controller 20 causes conduction sensor 23 to detect conduction between third electrode 13 and fourth electrode 14. In the step of switching, after conduction sensor 23 detects the conduction between third electrode 13 and fourth electrode 14, controller 20 switches the sensing operation of electrostatic sensor 22 from the OFF state to the ON state. In the step of detecting electrostatic capacitance, after switching the sensing operation of electrostatic sensor 22 from the OFF state to the ON state, controller 20 causes electrostatic sensor 22 to output detected value D1 related to the electrostatic capacitance between first electrode 11 and second electrode 12. In the step of inputting, controller 20 causes detected value D1 output by electrostatic sensor 22 to be input to determiner 21.

With this configuration, in the step of detecting electrostatic capacitance, after the sensing operation is switched to the ON state, electrostatic sensor 22 outputs detected value D1 related to the electrostatic capacitance between first electrode 11 and second electrode 12 and thus, as a result, the power consumption of electrostatic sensor 22 can be reduced. The control method is used on a computer system (control system 200). This means that the control method can be implemented using a program.

(2) Details
(2.1) Overall Configuration of Input System

Hereinafter, the overall configuration of input system 1 according to the present exemplary embodiment will be described in detail.

Input system 1 includes input device 100 and control system 200 as described above (refer to FIG. 1).

(2.2) Configuration of Input Device

First, the configuration of input device 100 will be described. As one example, three axes perpendicular to each other, namely, an X axis, a Y axis, and a Z axis, are set in the following description, as illustrated in FIG. 2 to FIG. 5. The axis extending along the thickness of low-profile housing 2 of input device 100 is denoted as the "Z axis". In the following description, there are cases where the direction along the Z axis is called "the vertical direction", the positive side of the Z axis is called "up/above", and the negative side of the Z axis is called "low/under". The pressing operation can be performed from the positive side to the negative side of the Z axis of input device 100 (pressing direction A1; refer to FIG. 6).

Each of four conductive members 10A to 10D to be described later has a length in one direction, and this longitudinal direction is along the "X axis". As input device 100 is viewed along the Z axis, a direction of alignment of four electrodes (first electrode 11 to fourth electrode 14) to be described later is along the "Y axis".

Each of the X axis, the Y axis, and the Z axis is a virtual axis; the arrows denoted as "X", "Y", and "Z" in the figures are indicated merely for the sake of explanation and are not substantive. These directions are not indicated to limit the direction of input device 100 when in use.

Input device 100 includes four conductive members 10A, 10B, 10C, 10D, insulation sheet 30, elastic body 35, movable plate 40, tactile feedback member 50, pressing element 55, and housing 60, as illustrated in FIG. 3. Hereinafter, just for the purpose of facilitating explanation, conductive members 10A, 10B, 10C, 10D will be referred to as first to fourth conductive members 10A, 10B, 10C, 10D as needed.

Unless otherwise noted, input device 100 that is not being operated will be described below; in other words, a situation in which no pressing operation is performed on input device 100 will be described below.

Figure 2:
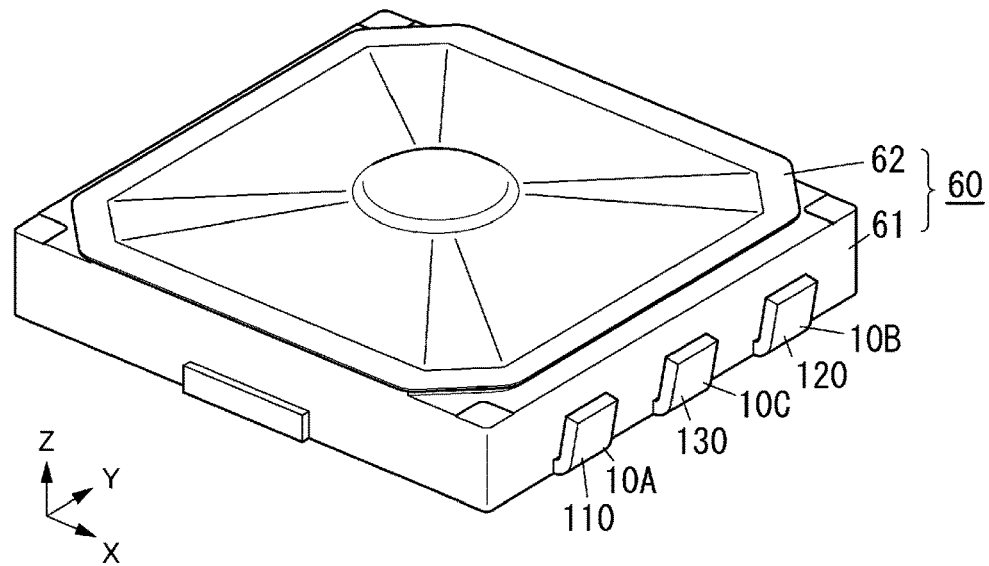
FIG. 2 is a perspective view of an input device included in the input system.

Housing 60 accommodates first to fourth conductive members 10A, 10B, 10C, 10D, insulation sheet 30, elastic body 35, movable plate 40, tactile feedback member 50, and pressing element 55. As illustrated in FIG. 2 and FIG. 3, housing 60 includes body 61 and cover 62 (protective sheet).

Body 61 is in the form of a quadrilateral (for example, square) box and is low-profile along the Z axis (the vertical direction). Body 61 has an opening in the upper surface. Body 61 includes recess 610 depressed downward from said opening. Recess 610 forms, together with cover 62 covering recess 610, housing room that accommodates insulation sheet 30, elastic body 35, movable plate 40, tactile feedback member 50, and pressing element 55. Body 61 has electrical insulating properties. For example, body 61 is made from resin. Body 61 may be made from ceramic.

Cover 62 is in the form of a quadrilateral (for example, square) sheet. Cover 62 has flexibility, heat-resistant properties, and electrically insulating properties. Cover 62 is a resin sheet, for example. Cover 62 is held on body 61 so as to cover recess 610 on the upper surface of body 61. For example, cover 62 is joined to the upper surface of body 61 by laser welding, ultrasonic welding, or the like and thereby closes the opening of recess 610 to seal recess 610.

This allows tactile feedback member 50 housed in housing 60 to be pressed via cover 62. The surface of cover 62 opposite from tactile feedback member 50 serves as an operation region of input device 100.

Figure 4:
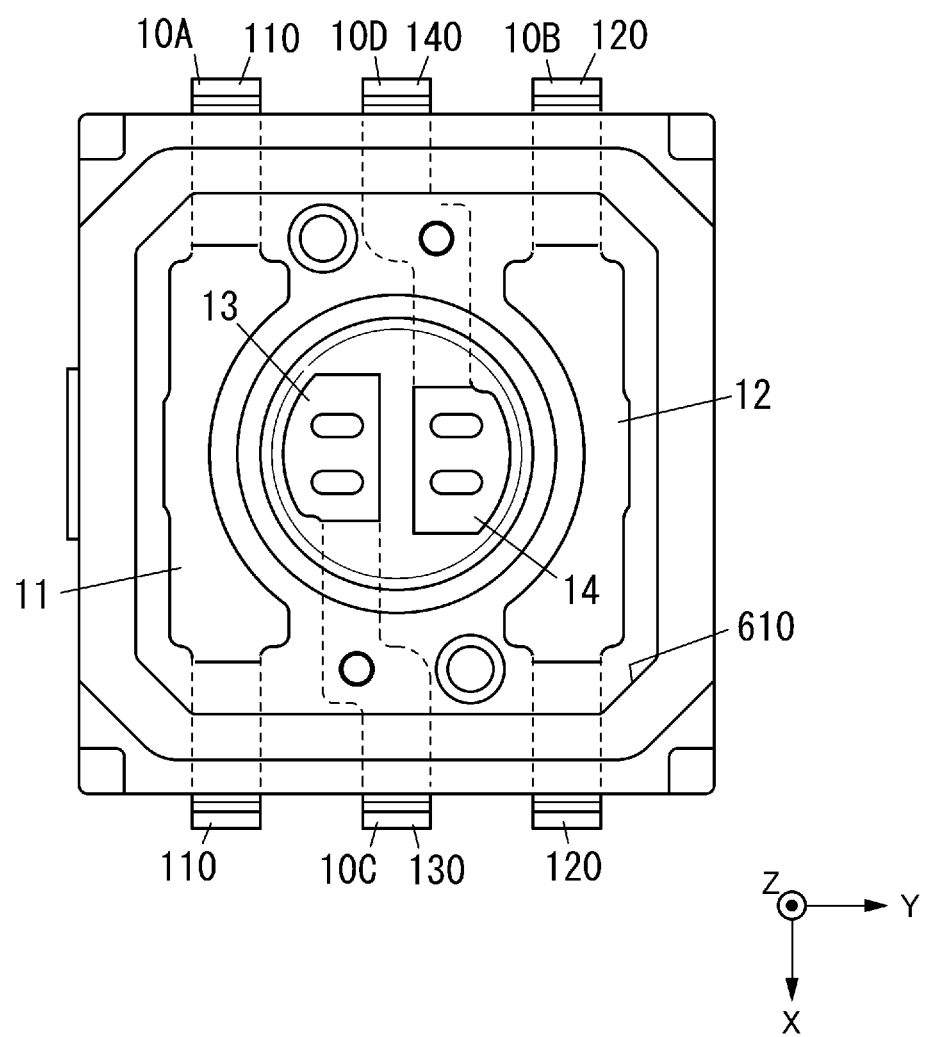
FIG. 4 is a plan view of a body of a housing and four electrodes included in the input device.

First conductive member 10A includes first electrode 11 and one pair of terminals 110, as illustrated in FIG. 3 and FIG. 4. First electrode 11 is in the form of an approximately rectangular flat plate. The edge of first electrode 11 on the positive side of the Y axis is dented in the negative direction of the Y axis into the shape of a circular arc as viewed along the Z axis. The pair of terminals 110 protrude from both ends of first electrode 11 in the longitudinal direction thereof. The pair of terminals 110 are exposed to the outside of body 61. The pair of terminals 110 protrude outward from outer surfaces of body 61 that are located at both ends thereof along the X axis. First conductive member 10A is located farthest in the negative direction of the Y axis among first to fourth conductive members 10A to 10D. It is not essential that first conductive member 10A include one pair of (two) terminals 110; one of terminals 110 may be omitted.

Second conductive member 10B includes second electrode 12 and one pair of terminals 120, as illustrated in FIG. 3 and FIG. 4. Second electrode 21 is in the form of an approximately rectangular flat plate. The edge of second electrode 12 on the negative side of the Y axis is dented in the positive direction of the Y axis into the shape of a circular arc as viewed along the Z axis. The pair of terminals 120 protrude from both ends of second electrode 12 in the longitudinal direction thereof. The pair of terminals 120 are exposed to the outside of body 61. The pair of terminals 120 protrude outward from the outer surfaces of body 61 that are located at both ends thereof along the X axis. Second conductive member 10B is located farthest in the positive direction of the Y axis among first to fourth conductive members 10A to 10D. It is not essential that second conductive member 10B include one pair of (two) terminals 120; one of terminals 120 may be omitted.

First and second conductive members 10A, 10B have the same shape and size, for example. First and second conductive members 10A, 10B are disposed so as to be symmetrical with respect to the X-Z plane. Furthermore, first and second conductive members 10A, 10B are disposed so as to sandwich third and fourth conductive members 10C, 10D therebetween along the Y axis.

For example, one of the pair of terminals 110 of first conductive member 10A can be electrically connected to electrostatic sensor 22 of control system 200, and one of the pair of terminals 120 of second conductive member 10B can be electrically connected to the ground of the printed board or the like. Note that one of the pair of terminals 110 may be electrically connected to the ground and one of the pair of terminals 120 may be electrically connected to electrostatic sensor 22.

Third conductive member 10C includes third electrode 13 and terminal 130, as illustrated in FIG. 3 and FIG. 4. Third electrode 13 is in the form of an approximately rectangular flat plate. Third electrode 13 is formed so that an edge thereof on the negative side of the Y axis bulges in the negative direction of the Y axis as viewed along the Z axis. Third conductive member 10C is positioned next to first conductive member 10A. Terminal 130 is exposed to the outside of body 61. Terminal 130 protrudes outward from the outer surface of body 61 that is located in the positive direction of the X axis.

Fourth conductive member 10D includes fourth electrode 14 and terminal 140, as illustrated in FIG. 3 and FIG. 4. Fourth electrode 14 is in the form of an approximately rectangular flat plate. Fourth electrode 14 is formed so that an edge thereof on the positive side of the Y axis bulges in the positive direction of the Y axis as viewed along the Z axis. Fourth conductive member 10D is positioned next to second conductive member 10B. Terminal 140 is exposed to the outside of body 61. Terminal 140 protrudes outward from the outer surface of body 61 that is located in the negative direction of the X axis.

Third and fourth conductive members 10C, 10D have the same shape and size, for example. Each of third and fourth conductive members 10C, 10D is formed in the approximate shape of a crank, as illustrated in FIG. 4. Third and fourth conductive members 10C, 10D are disposed in the form of a dyad symmetry with the center of rotation at the center of body 61 as viewed along the Z axis. Terminal 130 and terminal 140 are exposed to the outside at positions that match each other along the Y axis.

For example, terminal 130 of third conductive member 10C can be electrically, connected to conduction sensor 23, and terminal 140 of fourth conductive member 10D can be electrically connected to the ground of the printed board or the like. Note that terminal 130 may be electrically connected to the ground and terminal 140 may be electrically connected to conduction sensor 23.

First to fourth conductive members 10A to 10D can be formed from metal plate materials. First to fourth conductive members 10A to 10D are fixed to body 61 by insert molding or the like. First electrode 11 to fourth electrode 14 are exposed on the bottom of recess 610 of body 61. These electrodes are arranged in the positive direction of the Y axis in the following order: first electrode 11, third electrode 13, fourth electrode 14, and second electrode 12, as viewed from the positive side of the Z axis (refer to FIG. 4). Third electrode 13 and fourth electrode 14 are disposed at the approximate center of the bottom of recess 610.

Input device 100 can be mounted so that the back side of body 61 (a surface thereof located in the negative direction of the Z axis) faces a surface of a printed board or the like of various electrical devices.

Insulation sheet 30 is an insulator (dielectric material) in the form of a quadrilateral (for example, square) sheet, as illustrated in FIG. 3. Insulation sheet 30 has, in a central portion, hole 301 which is an approximately circular through-hole. Insulation sheet 30 is disposed in recess 610. Insulation sheet 30 is located between the bottom of recess 610 and elastic body 35. Insulation sheet 30 is disposed so as to cover first electrode 11 and second electrode 12 with third electrode 13 and fourth electrode 14 exposed through hole 301. In other words, first electrode 11 and second electrode 12 face elastic body 35 with insulation sheet 30 interposed therebetween. Insulation sheet 30 is thinner than elastic body 35, for example.

Elastic body 35 is in the form of a quadrilateral (for example, square) flat plate, as illustrated in FIG. 3. Elastic body 35 is electrically conductive. Elastic body 35 is, for example, a conductive rubber member. The external shape of elastic body 35 is roughly identical to the external shape of insulation sheet 30. Elastic body 35 has, in a central portion, hole 351 which is an approximately circular through-hole. The diameter of hole 351 is roughly equal to the diameter of hole 301 of insulation sheet 30. Elastic body 35 is disposed on insulation sheet 30 so that hole 351 becomes concentric with hole 301 of insulation sheet 30 in recess 610. Elastic body 35 includes a plurality of protrusions 352 (refer to FIG. 5) on a lower surface (a surface located in the negative direction of the Z axis). Elastic body 35 is disposed so that the plurality of protrusions 352 contact insulation sheet 30.

Movable plate 40 is in the form of a quadrilateral (for example, square) flat plate, as illustrated in FIG. 3. Movable plate 40 is formed from a metal plate material. The external shape of movable plate 40 is roughly identical to the external shapes of elastic body 35 and insulation sheet 30. Movable plate 40 has, in a central portion, hole 401 which is an approximately circular through-hole. The diameter of hole 401 is slightly smaller than the diameter of each of hole 351 of elastic body 35 and hole 301 of insulation sheet 30. Movable plate 40 is disposed on elastic body 35 so that hole 401, hole 351, and hole 301 become concentric in recess 610.

Third electrode 13 and fourth electrode 14 are exposed through above-described three holes 401, 351, 301 as viewed from the positive side of the Z axis. Third electrode 13 and fourth electrode 14 face, through these three holes, tactile feedback member 50 disposed on movable plate 40.

Tactile feedback member 50 as a whole is in the shape of a disc, as illustrated in FIG. 3. Tactile feedback member 50 includes clicking part 51 (elastic deformation part) 51 in a central portion (refer to FIG. 5). Tactile feedback member 50 is formed from an elastic material. Tactile feedback member 50 is formed by stacking two metal plates 501, 502 of substantially the same shape and size along the Z axis. Metal plates 501, 502 are so-called metal domes. Tactile feedback member 50 may include one metal plate (metal dome) or may include three or more metal plates (metal domes).

Figure 5:
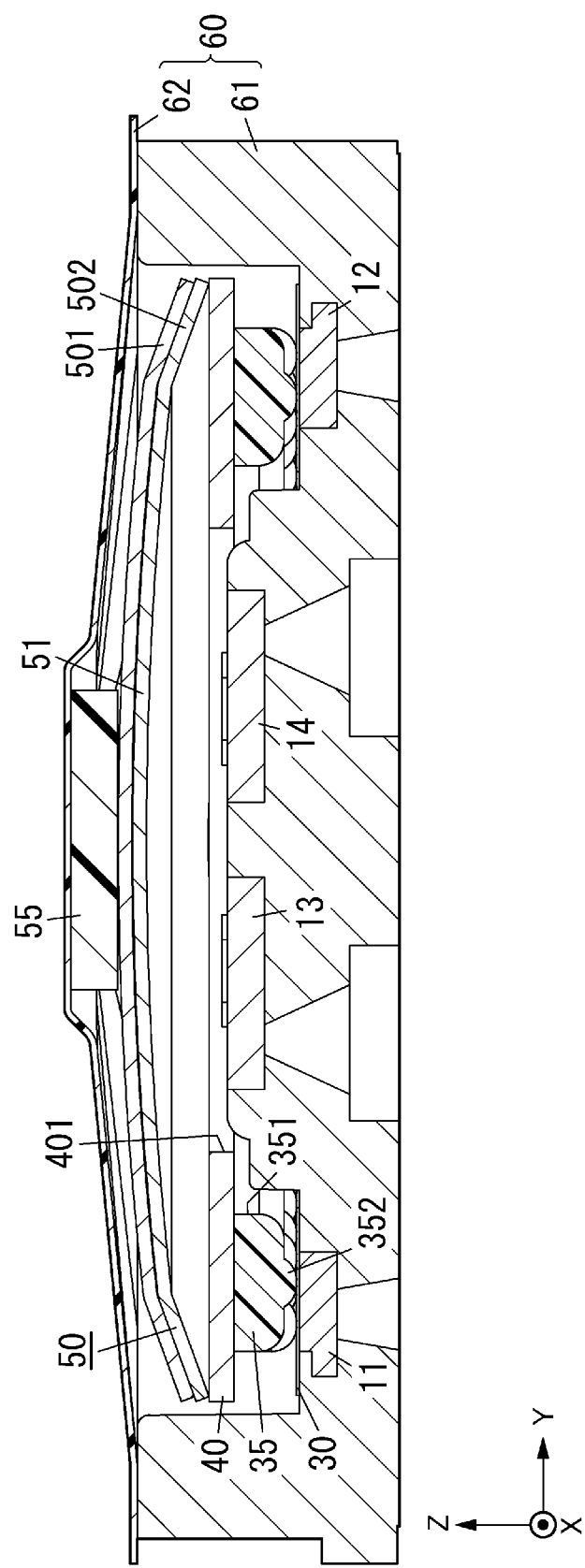
FIG. 5 is a cross-sectional view of the input device that is not being operated.
Figure 6:
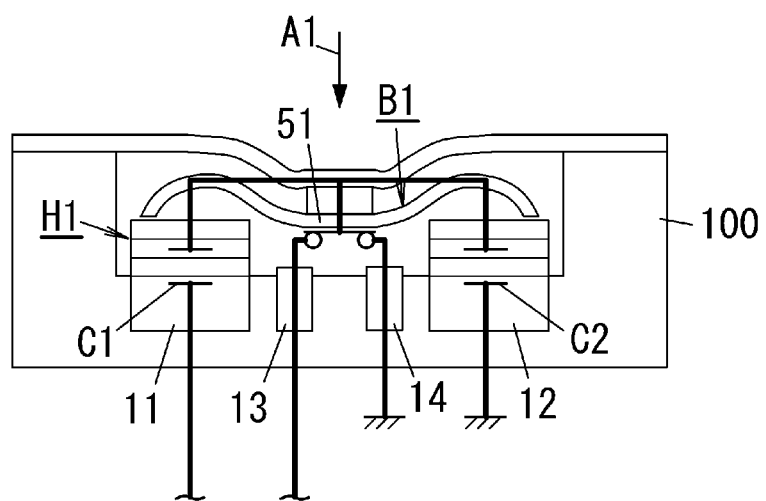
FIG. 6 is a schematic view of the input device that is being operated.

Clicking part 51 is formed of two metal plates 501, 502 with central portions thereof overlapping each other. Clicking part 51 is in the form of a dome-shaped plate. One surface of clicking part 51 along the thickness thereof (the upper surface in FIG. 5) is a convex surface and constitutes a pressing surface. As the pressing surface of clicking part 51 is pressed, clicking part 51 is elastically deformed as illustrated in FIG. 6, and thus a click feel is generated. More specifically, this elastic deformation causes the central portion of clicking part 51 to reverse and change from convex to concave (a buckled state). In this manner, when the pressing surface is pressed, clicking part 51 is elastically deformed so that the pressing surface is depressed and thus generates a click feel.

Tactile feedback member 50 is disposed on movable plate 40 so as to close hole 401 of movable plate 40 in recess 610. When input device 100 is not being operated, clicking part 51 faces third electrode 13 and fourth electrode 14 with given spacing therebetween along the Z axis, as illustrated in FIG. 5. At least when input device 100 is not being operated, third electrode 13 and fourth electrode 14 are in a non-conducting state.

On the other hand, when input device 100 is operated, as clicking part 51 enters into the buckled state, clicking part 51 receives pressure and thus contacts both third electrode 13 and fourth electrode 14 at substantially the same time. As a result, third electrode 13 and fourth electrode 14 conduct electricity therebetween via tactile feedback member 50. This means that terminal 130 and terminal 140 are in a conducting state. As the pressing force is reduced, clicking part 51 that has buckled returns elastically and thus separates from third electrode 13 and fourth electrode 14, and terminal 130 and terminal 140 return to the non-conducting state.

In the present exemplary embodiment, movable plate 40 and tactile feedback member 50 constitute movable contact B1. Input device 100 is configured so that in the normal mode, when movable contact B1 is pressed, the electrostatic capacitance between first electrode 11 and second electrode 12 changes, and when movable contact B1 is further pressed after the electrostatic capacitance changes, third electrode 13 and fourth electrode 14 conduct electricity therebetween.

Pressing element 55 is a member that presses clicking part 51 of tactile feedback member 50 in order to facilitate elastic deformation of clicking part 51. Pressing element 55 has electrical insulating properties. For example, pressing element 55 is made from resin. Pressing element 55 is in the shape of a disc, as illustrated in FIG. 3. The external shape of pressing element 55 is smaller than the external shape of clicking part 51 of tactile feedback member 50. Pressing element 55 is disposed between cover 62 and tactile feedback member 50 while being held down by cover 62 in the negative direction of the Z axis. Note that pressing element 55 is not limited to being disposed under cover 62 (in the negative direction of the Z axis) and may be disposed above cover 62 (in the positive direction of the Z axis). Pressing element 55 is fixed to cover 62 or tactile feedback member 50.

In input device 100, first electrode 11 of first conductive member 10A, second electrode 12 of second conductive member 10B, insulation sheet 30, elastic body 35, and movable contact 131 constitute pressing detector H1 (refer to FIG. 1). Pressing detector H1 detects a pressing force that acts on the pressing surface of tactile feedback member 50. Pressing detector H.1 is an electrostatic capacitive pressure sensor.

Furthermore, in input device 100, third electrode 13 of third conductive member 10C, fourth electrode 14 of fourth conductive member 10D, and movable contact B1 constitute a click detector that detects elastic deformation of clicking part 51 (that is, generation of a click feel). Particularly, in the power-saving mode of input system 1, when third electrode 13 and fourth electrode 14 conduct electricity by the generation of a click feel, the sensing operation of electrostatic sensor 22 is switched from the OFF state to the ON state.

(2.3) Operation of Input Device

Next, the operation of input device 100 will be briefly described.

Assume that a user starts pressing for operation input from above cover 62 of input device 100 (the positive side of the Z axis) with a fingertip. As the amount of pressing (stroke) on tactile feedback member 50 of movable contact B1 increases, the electrostatic capacitance of pressing detector H1 increases.

As illustrated in FIG. 1 and FIG. 6, pressing detector H1 can be said to constitute capacitor C1 and capacitor C2 which are electrically connected in series. Capacitor C1 incudes first electrode 11 of first conductive member 10A, insulation sheet 30 (dielectric material), elastic body 35, and movable contact B1. Capacitor C2 incudes second electrode 12 of second conductive member 10B, insulation sheet 30 (dielectric material), elastic body 35, and movable contact B1. As the amount of pressing (stroke) on tactile feedback member 50 increases, the dielectric material between movable plate 40 and each of first electrode 11 and second electrode 12 deforms to be slightly squashed, and the electrostatic capacitance of capacitors C1, C2 increases.

When the amount of pressing (stroke) on tactile feedback member 50 further increases and reaches a specified value, clicking part 51 of tactile feedback member 50 buckles and a click feel is generated. When having buckled, clicking part 51 touches both third electrode 13 and fourth electrode 14, as illustrated in FIG. 6. This means that the elastic deformation of clicking part 51 allows conduction between third electrode 13 and fourth electrode 14. Furthermore, when clicking part 51 contacts both third electrode 13 and fourth electrode 14, the circuit between third electrode 13 and fourth electrode 14 is electrically connected to the midpoint of the path between capacitor C1 and capacitor C2. The inventors have conducted experiments and verified the impact of short-circuiting that is caused by the circuit between third electrode 13 and fourth electrode 14 being connected to said midpoint. As a result, the inventors have confirmed that the pressing (pressure sensitivity) of pressing detector H1 and the electric conduction and non-conduction between third electrode 13 and fourth electrode 14 (ON and OFF of a click) can be detected independently without problems regarding the short-circuiting.

Although details will be described later, control system 200 receives, from input device 100, detected value D1 related to the electrostatic capacitance of capacitors C1, C2 mentioned above, and thus can perform a process corresponding to the magnitude of external pressing. Furthermore, control system 200 can perform a process corresponding to the conduction or non-conduction between third electrode 13 and fourth electrode 14.

Pressing detector H1 is an electrostatic capacitive pressure sensor and therefore can be used as a proximity sensor for an object at the ground potential (for example, a finger of a user) as long as electrostatic sensor 22 of control system 200 is ON. In this case, formation of a pseudo capacitor between the object at the ground potential and the pressure sensor (pressing detector H1) is utilized. As one example, input device 100 can detect by pressing detector H1 that there is a finger of a user or the like around tactile feedback member 50.

(2.4) Configuration of Control System

Next, the configuration of control system 200 will be described.

Control system 200 includes controller 20, determiner 21, electrostatic sensor 22, and conduction sensor 23, as illustrated in FIG. 1.

Controller 20 can be implemented using a computer system including one or more processors (microprocessors) and one or more memories, for example. Specifically, one or more processors function as controller 20 by performing one or more programs (applications) stored in one or more memories. The programs have been recorded in the memories of controller 20 in advance, but the programs may be provided through electric communication lines such as the Internet or may be recorded on non-transitory recording media such as memory cards to be provided.

Controller 20, which is connected to each of electrostatic sensor 22, conduction sensor 23, and determiner 21 so as to allow communication therewith, controls these elements. In particular, controller 20 is configured to be able to switch the sensing operation of electrostatic sensor 22 to the ON state or the OFF state. Controller 20 may also be configured to be able to switch the sensing operation of conduction sensor 23 to the ON state or the OFF state.

Electrostatic sensor 22, which includes an integrated circuit (IC), for example, is electrically connected to first electrode 11 of input device 100. The sensing operation of electrostatic sensor 22 is switched to the OFF state or the ON state under the control of controller 20. In the ON state, electrostatic sensor 22 applies a voltage to first electrode 11 and drives the pressure sensor (pressing detector H1) of input device 100. In the ON state, electrostatic sensor 22 obtains information related to the electrostatic capacitance of capacitors C1, C2 of pressing detector H1. This means that electrostatic sensor 22 outputs detected value D1 related to the electrostatic capacitance between first electrode 11 and second electrode 12 of input device 100. When the sensing operation is in the OFF state, electrostatic sensor 22 stops driving pressing detector (that is, supplying of a voltage to first electrode 11).

Conventionally well-known various methods can be used as a method for obtaining the information (detected value D1) related to the electrostatic capacitance of pressing detector H1. As one example, the switched capacitor technique can be used. With the switched capacitor technique, the electrostatic capacitance (a change therein) of capacitors C1, C2 of pressing detector H1 is detected on the basis of the amount of charges accumulated therein. For example, electrostatic sensor 22 incorporates therein a capacitor for use in the determination. During a predetermined period of time, electrostatic sensor 22 alternately and repeatedly performs a charging process of charging capacitors C1, C2 by applying a voltage to first electrode 11 and a discharging process of discharging capacitors C1, C2 to charge the capacitor for use in the determination with the accumulated charges. When the voltage between both ends of the capacitor for use in the determination reaches a specified value, the discharging process ends, and the charging process starts. This means that as the electrostatic capacitance of capacitors C1, C2 increases, the number of times the voltage between both ends of the capacitor for use in the determination reaches the specified value during the predetermined period of time increases. Therefore, electrostatic sensor 22 can detect a change in the electrostatic capacitance of pressing detector H1 according to the number of times the voltage between both ends of the capacitor for use in the determination reaches the specified value during the predetermined period of time. In the case where the switched capacitor technique is used to detect the electrostatic capacitance, "detected value D1" may be the aforementioned number of times or may be time required for the voltage between both ends of the capacitor for use in the determination to reach the specified value. Furthermore, detected value D1 may be an electric physical quantity, may be the value (farad) of electrostatic capacitance obtained by calculation, for example, or may be a value proportional to the value of the electrostatic capacitance.

The detection result of electrostatic sensor 22 is transmitted to determiner 21. In other words, detected value D1 output by electrostatic sensor 22 is input to determiner 21 (the step of inputting). The detection result of electrostatic sensor 22 may be transmitted to determiner 21 via controller 20.

Conduction sensor 23 is electrically connected to third electrode 13 of input device 100. Conduction sensor 23 is configured to detect the conduction between third electrode 13 and fourth electrode 14. Conduction sensor 23, which includes a resistor (a voltage detection element) electrically connected to third electrode 13 in series, for example, detects the conduction on the basis of the magnitude of the voltage between both ends of the resistor. The detection result of conduction sensor 23 is transmitted to controller 20.

Determiner 21 is electrically connected to electrostatic sensor 22 and is configured to determine, on the basis of the output from electrostatic sensor 22, whether movable contact B1 has been pressed.

Determiner 21 can be implemented using a computer system including one or more processors (microprocessors) and one or more memories, for example. Specifically, one or more processors function as determiner 21 by performing one or more programs (applications) stored in one or more memories. The programs have been recorded in the memories of determiner 21 in advance, but the programs may be provided through electric communication lines such as the Internet or may be recorded on non-transitory recording media such as memory cards to be provided.

Determiner 21 includes storage 21A as illustrated in FIG. 1. Storage 21A includes a rewritable, non-volatile memory such as an electrically erasable programmable read-only memory (EEPROM). Storage 21A stores reference value Rf1.

In the present exemplary embodiment, by comparing reference value Rf1 and detected value D1 output by electrostatic sensor 22, determiner 21 determines whether movable contact B1 has been pressed.

Reference value Rf1 is a value determined as a value related to electrostatic capacitance in a stable state where there is no operation input (touching or pressing) from a user to input device 100. Reference value Rf1 may be a fixed value that is set in advance however, in the present exemplary embodiment, reference value Rf1 is a value that may vary every time electrostatic sensor 22 is driven. For example, reference value Rf1 is set on the basis of detected value D1 output upon switching from the last normal mode to the power-saving mode, and is stored (saved) in storage 21A.

In the present exemplary embodiment, determiner 21 is structurally separate from controller 20. However, at least a part of the functions of determiner 21 may be provided in controller 20. For example, controller 20 and determiner 21 may be integrally formed from one microprocessor.

(2.5) Driving of Electrostatic Sensor

Controller 20 according to the present exemplary embodiment causes conduction sensor 23 to detect the conduction between third electrode 13 and fourth electrode 14 (the step of detecting conduction). After conduction sensor 23 detects the conduction between third electrode 13 and fourth electrode 14, controller 20 switches the sensing operation of electrostatic sensor 22 from the OFF state to the ON state (the step of switching). In other words, electrostatic sensor 22 is switched to the ON state under a "first condition" stipulating, as a prerequisite, that the conduction between third electrode 13 and fourth electrode 14 is detected. Furthermore, controller 20 causes electrostatic sensor 22 to output (detect) detected value D1 related to the electrostatic capacitance between first electrode 11 and second electrode 12 (the step of detecting electrostatic capacitance).

As one example, controller 20 switches the sensing operation of electrostatic sensor 22 from the OFF state to the ON state after conduction sensor 23 detects the conduction between third electrode 13 and fourth electrode 14 and then detects undoing of the conduction. This means that when a "second condition" that undoing of the conduction is detected is met in addition to the first condition that the conduction is detected, which is a prerequisite, controller 20 starts (or resumes) the sensing operation of electrostatic sensor 22. In other words, the sensing operation is started as a result of detection of a series of actions including buckling of clicking part 51, conduction between third electrode 13 and fourth electrode 14, then a reduction in the pressing force, elastic recovery of clicking part 51, and returning to the non-conducting state.

In particular, "immediately after" conduction sensor 23 detects undoing of the conduction between third electrode 13 and fourth electrode 14, controller 20 switches the sensing operation of electrostatic sensor 22 from the OFF state to the ON state.

The time "immediately after" undoing of the conduction is defined, for example, as a point in time at which one-half of the period of clock pulses that are output in a constant cycle from an oscillator or a clock pulse generation circuit included in controller 20 to an integral multiple of the one-half of the period (for example, less than 1 millisecond) has elapsed since the timing of detection of undoing of the conduction.

When determining that a period for which movable contact B1 has not been pressed reaches a predetermined period (for example, a few minutes) while the sensing operation of electrostatic sensor 22 is in the ON state, controller 20 switches the sensing operation of electrostatic sensor 22 from the ON state to the OFF state. In other words, controller 20 switches the operation mode from the normal mode to the power-saving mode. In the power-saving mode, driving of pressing detector H1 (that is, supplying of a voltage to first electrode 11) is not performed, and therefore the power consumption of electrostatic sensor 22 can be reduced.

(2.5) Overall Operation of Input System

Hereinafter, the overall operation of input system 1 will be described with reference to the graph illustrated in FIG. 7.

First, until time t1, input system 1 operates in the normal mode. This means that the sensing operation of electrostatic sensor 22 is in the ON state until time t1. In the graph illustrated in FIG. 7, the horizontal axis represents time, and the vertical axis represents a value (output) related to the electrostatic capacitance.

Figure 7:
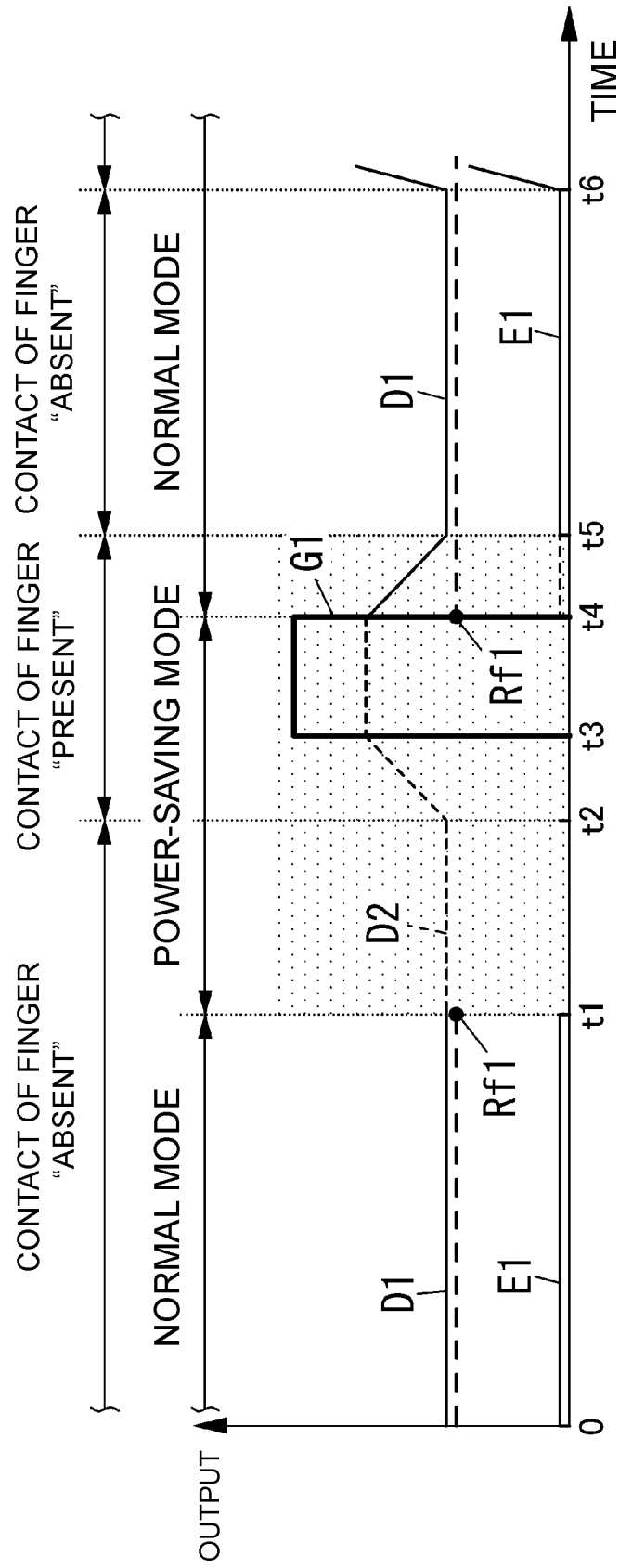
FIG. 7 is a graph for describing the operation of the input system.

In the example illustrated in FIG. 7, the period for which movable contact B1 has not been pressed reaches the predetermined period at time t1, and thus controller 20 switches the operation mode from the normal mode to the power-saving mode. This means that the sensing operation of electrostatic sensor 22 changes from the ON state to the OFF state at time t1.

At this time, controller 20 causes storage 21A of determiner 21 to store, as reference value Rf1 to be used in the next normal mode, detected value D1 output at time t1. In FIG. 7, detected value D1 (an actual measurement value) which is output when the sensing operation of electrostatic sensor 22 is in the ON state is indicated by a solid line, and detected value D2 (a predicated value) which is predicted to be output if the sensing operation of electrostatic sensor 22 is in the ON state although the sensing operation of electrostatic sensor 22 is in the OFF state.

In the example illustrated in FIG. 7, a user does not provide an operation input to input device 100 until time t2. A user starts providing an operation input to input device 100 with a fingertip at time t2 and is finished providing the operation input at time t5. This means that the fingertip of the user remains in contact with input device 100 between time t2 and time t5.

From time t2 to time t3, the user increases the pressing force, the electrostatic capacitance of capacitors C1, C2 of pressing detector H1 increases, and as a result, detected value D2 (the predicted value) increases proportionally. In FIG. 7, "G1" indicates ON/OFF of a click. At time t3, clicking part 51 buckles and contacts third electrode 13 and fourth electrode 14, allowing conduction between third electrode 13 and fourth electrode 14 (which may be hereinafter referred to simply as "ON of a click"). Subsequently, the pressing force from the user decreases, and at time t4, clicking part 51 separates from third electrode 13 and fourth electrode 14 by elastic recovery, resulting in non-conduction between third electrode 13 and fourth electrode 14 (which may be hereinafter referred to simply as "OFF of a click").

In the example illustrated in FIG. 7, controller 20 switches the sensing operation of electrostatic sensor 22 from the OFF state to the ON state immediately after time t4 at which the conduction between third electrode 13 and fourth electrode 14 is undone. In other words, input system 1 operates in the normal mode immediately after time t4.

The period between time t4 and time t5 is a period in which the user is further lifting the fingertip from input device 100 after OFF of the click. In the period between time t4 and time t5, according to the process in which the fingertip is separating from input device 100, the electrostatic capacitance of capacitors C1 and C2 is decreasing toward electrostatic capacitance that is measured in the state where there is no operation input. At time t5, the fingertip of the user is completely separate from input device 100.

Determiner 21 receives detected value D1 from electrostatic sensor 22 in the ON state after time t4. On the basis of detected value D1 that is output by electrostatic sensor 22, determiner 21 determines how much change has been made with respect to reference value Rf1 determined as a value related to the electrostatic capacitance in the stable state where there is no operation input from a user to input device 100. Specifically, determiner 21 calculates a value (hereinafter referred to as a "relative value") based on the difference between reference value Rf1 and detected value D1 (absolute value) output by electrostatic sensor 22, for example. In the example illustrated in FIG. 7, the relative value is denoted as "E1".

In the present exemplary embodiment, in the normal mode after time t5, determiner 21 performs the determination as needed by comparing detected value that is output by electrostatic sensor 22 and reference value WI (that is, detected value D1 at time t1) stored in storage 21A, as described above, and thus calculates relative value E1. In other words, controller 20 switches the sensing operation of electrostatic sensor 22 from the OFF state to the ON state and then to the OFF state (time t1). Controller 20 subsequently sets reference value Rf1 for when the sensing operation changes from the OFF state to the ON state, on the basis of detected value D1 output by electrostatic sensor 22 before the sensing operation is switched from the ON state to the OFF state (the detected value at time t1).

In the normal mode, controller 20 outputs, to the outside, a control signal corresponding to ON of a click, for example. Furthermore, in the normal mode, controller 20 outputs, to the outside, various control signals corresponding to the magnitude of relative value E1 (that may include relative value E1 calculated in the state of ON of a click, for example). Determiner 21 compares the magnitude of relative value E1 and a plurality of threshold values, estimates a situation of pressing from a user, and inputs an estimation result to controller 20. Controller 20 outputs a control signal corresponding to the estimation result. Specifically, determiner 21 may estimate the situation of pressing without stages or may estimate the situation of pressing in multiple stages, for example, three stages that are light pressing (touching), slightly strong pressing (moderate pressing), and strong pressing (hard pressing). In the case of estimation in three stages, the plurality of threshold values to be compared with the magnitude of relative value E1 may include a first threshold value corresponding to "touching", a second threshold value corresponding to "moderate pressing", and a third threshold value corresponding to "hard pressing". Out of the first threshold value, the second threshold value, and the third threshold value, the first threshold value is smallest, and the third threshold value is largest.

For example, when the magnitude of relative value E1 is greater than or equal to the first threshold value, but less than the second threshold value, determiner 21 estimates that the situation of pressing is "touching". When the magnitude of relative value E1 is greater than or equal to the second threshold value, but less than the third threshold value, determiner 21 estimates that the situation of pressing is "moderate pressing". When the magnitude of relative value E1 is greater than or equal to the third threshold value, determiner 21 estimates that the situation of pressing is "hard pressing". When the magnitude of relative value E1 is less than the first threshold value, determiner 21 estimates that there is "no pressing".

This estimation of the situation of pressing from the magnitude of relative value E1 in multiple stages using the plurality of threshold values is merely one example. Determiner 21 may only estimate whether there is pressing corresponding to "moderate pressing", for example.

In the normal mode, controller 20 transmits corresponding control signals to a processing circuit (not illustrated in the drawings) that executes applications on electrical devices such as mobile information terminals, in-vehicle device, home appliances, or video game consoles, for example. In the normal mode, for example, controller 20 transmits a first control signal when the estimation result of determiner 21 is "touching", transmits a second control signal when the estimation result is "moderate pressing", and transmits a third control signal when the estimation result is "hard pressing". In the normal mode, when the estimation result of determiner 21 is "no pressing", controller 20 does not transmit control signals. Furthermore, in the normal mode, when conduction sensor 23 detects the conduction, controller 20 transmits an ON signal (an ON signal that is generated after ON of a click at the time of the operation for releasing the OFF state of electrostatic sensor 22). The processing circuit of the electrical device performs processing corresponding to each of the first to third controls signals and the ON signal received from input system 1.

Determiner 21 may be configured to be able to, when performing the estimation, distinguish between a situation of pressing in a process in which a fingertip of a user is moving downward into input device 100 and a situation of pressing in a process in which a fingertip of a user is separating from input device 100. Determiner 21 may only estimate a situation of pressing in the process in which the fingertip is moving downward into input device 100.

The serial operation input from the user that is provided between time t2 and time t5 in FIG. 7 can be described as a "recovery operation for releasing the OFF state of the sensing operation of electrostatic sensor 22". Furthermore, in the example illustrated in FIG. 7, when some time elapses after the end of the recovery operation, the next operation input (time t6) is provided, and the processing circuit of the electrical devices achieves the processing desired by the user. Regarding this recovery operation, there are cases where it is not desirable to transmit, to the processing circuit of the electrical device, the control signal corresponding to a change in the electrostatic capacitance (a change in detected value D1) that occurs in the period between time t4 and time t5, which is in the course of the recovery operation.

In view of this, in the present exemplary embodiment, determiner 21 determines, regardless of the magnitude of relative value E1, that movable contact B1 has not been pressed, until detected value D1 falls within a predetermined range including reference value Rf1 for the first time since ON and OFF of the click and entry of electrostatic sensor 22 into the ON state. As a result, controller 20 does not transmit control signals (or transmits a signal indicating that there is "no pressing") in the period between time t4 and time t5, which is in the course of the recovery operation. The "predetermined range" is, for example, a range defined to include a tolerance (that is +3% as one example) relative to reference value Rf1.

In other words, after controller 20 switches the sensing operation of electrostatic sensor 22 from the OFF state to the ON state (after time t4), until detected value D1 output by electrostatic sensor 22 falls within the predetermined range including reference value Rf1, determiner 21 determines that movable contact B1 has not been pressed. After detected value D1 output by electrostatic sensor 22 falls within the predetermined range including reference value Rf1 (after time t5), determiner 21 determines whether movable contact B1 has been pressed.

Thus, it is possible to reduce the occurrences of movable contact B1 being determined as being pressed when a user attempts to perform the recovery operation, as a result of detecting a change in the electrostatic capacitance that occurs in the process in which the fingertip is separating from input device 100 during the recovery operation. This can lead to a reduction in unintended processes resulting from transmission of the control signal in the recovery operation to the processing circuit of the electrical device. This results in improved usability for a person (a user) who operates input device 100.

[Advantages]

In the present exemplary embodiment, as described above, controller 20 switches the sensing operation of electrostatic sensor 22 from the OFF state to the ON state after conduction sensor 23 detects the conduction between third electrode 13 and fourth electrode 14. This means that the sensing operation of electrostatic sensor 22 is maintained in the OFF state at least until conduction sensor 23 detects the conduction. In the case illustrated in FIG. 7, input system 1 operates in the power-saving mode at least between time t1 and time t3 at which the conduction is detected. As a result, the power consumption of electrostatic sensor 22 can be reduced.

Furthermore, in the present exemplary embodiment, the sensing operation of electrostatic sensor 22 is switched from the OFF state to the ON state after conduction sensor 23 detects the conduction and then detects undoing of the conduction. In the case illustrated in FIG. 7, input system 1 operates in the power-saving mode between time t1 and time t4 at which undoing of the conduction is detected, via time t3 at which the conduction is detected. As a result, the power consumption of electrostatic sensor 22 can be further reduced. Furthermore, determiner 21 is less likely to determine that there is pressing in the period between a point in time at which conduction sensor 23 detects the conduction and a point in time at which said conduction is undone (between time t3 and time t4), leading to improved reliability related to the determination of determiner 21.

Furthermore, "immediately after" conduction sensor 23 detects undoing of the conduction, controller 20 switches the sensing operation of electrostatic sensor 22 from the OFF state to the ON state. Therefore, the sensing operation of electrostatic sensor 22 is started quickly, thus leading to improved usability for a person (a user) who operates input device 100.

Particularly, in the present exemplary embodiment, detected value D1 output before the sensing operation is switched from the ON state to the OFF state (the detected value at time t1) is stored into storage 21A, and reference value PSI for when the sensing operation changes from the OFF state to the ON state (at time t4) is set on the basis of detected value D1 that has been stored. Therefore, reliability related to the determination of determiner 21 further improves as compared to the case where detected value D1 in the recovery operation (at time t4) is set to reference value Rf1 and the determination is performed, for example. Specifically, if detected value D1 that is output in the state where the fingertip is in contact during the recovery operation is set to reference value Rf1, there is a possibility that reference value Rf1 which is a value related to the electrostatic capacitance in the stable state where there is no operation input may be set greater than this should be. For this reason, when detected value D1 that is output before the sensing operation is switched from the ON state to the OFF state (the detected value at time t1) is set to reference value Rf1, the determination is performed using reference value Rf1 that is more reliable.

(3) Variations

The above-described exemplary embodiment is merely one of various exemplary embodiments of the present disclosure. Various changes can be made to the above-described exemplary embodiment according to the design or the like as long as the object of the present disclosure can be achieved. Furthermore, functions that are substantially the same as those of input system 1 according to the above-described exemplary embodiment may be implemented, for example, as a method for controlling input system 1, a computer program, or a non-transitory recording medium on which the computer program is recorded.

Variations of the above-described exemplary embodiment will be detailed below. The variations described below can be combined and applied as appropriate. Hereinafter, the above-described exemplary embodiment may also be referred to as a "basic example".

Input system 1 according to the present disclosure includes a computer system. The computer system mainly includes a processor and a memory as hardware. By the processor executing a program recorded in the memory of the computer system, the functions of input system 1 according to the present disclosure are implemented. The program may have been recorded in the memory of the computer system in advance, may be provided through an electric communication line, or may be recorded on a non-transitory recording medium to be provided such as a memory card, an optical disc, or a hard disk drive that can be read by the computer system. The processor of the computer system is configured of one or more electronic circuits including a semiconductor integrated circuit (IC) or large-scale integration (LSI). An integrated circuit such as the IC or the LSI is called differently depending on the level of integration; examples of the integrated circuit include system LSI, very-large-scale integration (VLSI), and ultra-large-scale integration (ULSI). A field-programmable gate array (FPGA) which allows programming after LSI manufacturing or a logical device that allows reconfiguration of the internal connections of LSI or reconfiguration of the internal circuit cells of LSI can also be used as the processor. The plurality of electronic circuits may be built into one chip or may be distributed across two or more chips. The two or more chips may be built into one device or may be distributed across two or more devices. The computer system includes a microcontroller including one or more processors and one or more memories. Therefore, the microcontroller is also configured of one or more electronic circuits including a semiconductor integrated circuit or large-scale integration.

The feature that the functions of input system 1 are aggregated into one housing is not essential. For example, the structural elements of input system 1 may be distributed across two or more housings. Conversely, the functions of input system 1 may be aggregated into one housing. Furthermore, at least a part of the functions of input system 1, for example, a part of the functions of input system 1, may be implemented using cloud storage (cloud computing) or the like.

(3.1) Variation 1

Hereinafter, Variation 1 of input system 1 will be described with reference to the graph illustrated in FIG. 8. In the following description, in Variation 1, structural elements that are substantially the same as those in the basic example will be assigned the same reference marks and description thereof may be omitted as appropriate.

In the basic example, until detected value D1 output by electrostatic sensor 22 falls within the predetermined range including reference value Rf1 after controller 20 switches the sensing operation of electrostatic sensor 22 to the ON state (after time t4), determiner 21 determines that movable contact B1 has not been pressed. In other words, until the fingertip of the user separates from input device 100 and the recovery operation is completed, determiner 21 in the basic example determines, regardless of a change in the electrostatic capacitance, that movable contact B1 has not been pressed.

However, for example, there is a demand that the next operation input needs to be provided before the fingertip of the user completely separates from input device 100 during the recovery operation. In the basic example, however, a user needs to sense that the recovery operation is completed, that is, needs to pause, before providing the next operation input. In the case where quick operation input is required, this "pause" can be significant time loss.

Input system 1 according to the present variation is different from that in the basic example in that input system 1 according to the present variation is configured to be able to continuously makes a determination on pressing related to the next operation input even during the recovery operation. In the present variation, determiner 21 makes a pressing-related determination using auxiliary reference value Rf2 in addition to reference value Rf1 used in the basic example.

Figure 8:
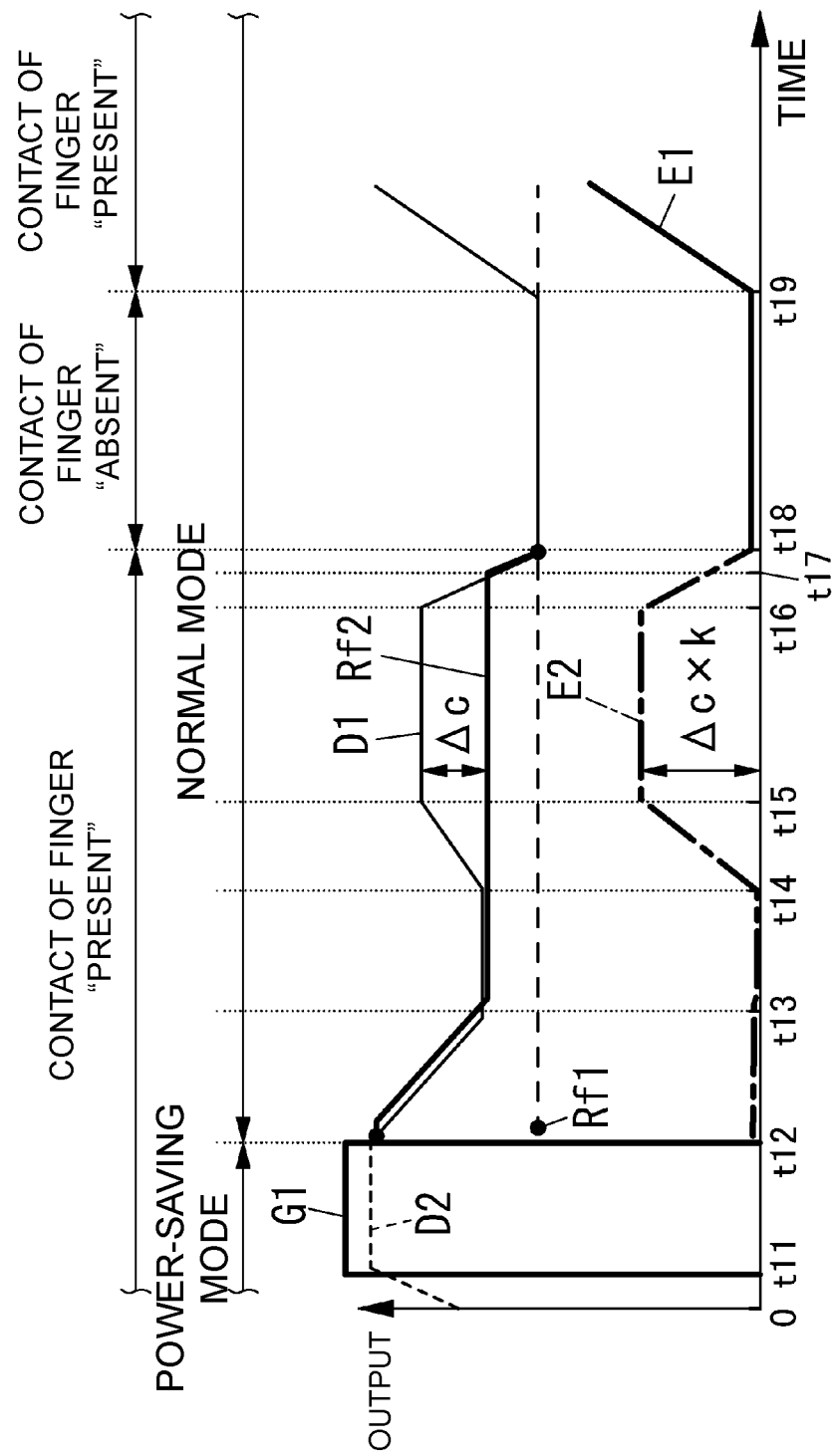
FIG. 8 is a graph for describing the operation of the input system according to a variation.

FIG. 8 is a graph focusing on the operation of input system 1 performed after "G1" indicating ON and OFF of a click. In the example illustrated in FIG. 8, the click is turned ON at time t11 and turned OFF at time t12. Controller 20 switches the sensing operation of electrostatic sensor 22 from the OFF state to the ON state immediately after time t12 at which the conduction between third electrode 13 and fourth electrode 14 is undone. In other words, input system 1 operates in the normal mode immediately after time t12.

Similar to the basic example, controller 20 causes storage 21A of determiner 21 to store, as reference value Rf1, detected value D1 output by electrostatic sensor 22 before the sensing operation is switched from the ON state to the OFF state.

In the present variation, after controller 20 switches the sensing operation of electrostatic sensor 22 from the OFF state to the ON state, storage 21A of determiner 21 stores, as auxiliary reference value RF2, detected value D1 output by electrostatic sensor 22. In the example illustrated in FIG. 8, detected value D1 output by electrostatic sensor 22 at time t12 is set to auxiliary reference value Rf2. Storage 21A is capable of storing reference value Rf1 and auxiliary reference value Rf2 separately.

Subsequently (after time t12), until detected value D1 output by electrostatic sensor 22 falls within a predetermined range including reference value Rf1 (for example, a range defined to include a tolerance), determiner 21 compares detected value D1 output by electrostatic sensor 22 and auxiliary reference value Rf2 as needed. When detected value D1 output by electrostatic sensor 22 is less than auxiliary reference value Rf2, determiner 21 updates auxiliary reference value Rf2 in storage 21A with detected value D1 that has been output.

In the process in which the fingertip of the user is separating from input device 100, detected value D1 gradually decreases toward reference value Rf1 and thus, auxiliary reference value Rf2 that is updated is also decreasing following detected value D1 that is decreasing. While detected value D1 from electrostatic sensor 22 is smaller than auxiliary reference value Rf2, determiner 21 updates auxiliary reference value Rf2 with immediately preceding detected value as needed, thus performing feedback control so that the magnitude of relative value E2, which is obtained in every update (indicated by the dot-dash line in FIG. 8), approaches zero. Relative value E2 is based on the difference between detected value D1 from electrostatic sensor 22 and auxiliary reference value Rf2. As a result, in the process in which the fingertip is separating, the magnitude of relative value E2 is maintained at a value close to zero, and determiner 21 determines that movable contact B1 has not been pressed.

For example, in the period between time t12 and time t13, the electrostatic capacitance decreases with a decrease in the pressing from the user and as a result, detected value D1 also decreases toward reference value Rf1. In this period, determiner 21 updates auxiliary reference value Rf2 as needed and calculates relative value E2. Relative value E2 is slightly greater than zero in the period between time t12 and time t13.

In the period between time t13 and time t14, the user stops moving the fingertip in an attempt to continuously provide the next operation input before the fingertip is completely separate from input device 100, thus the electrostatic capacitance stops decreasing, and detected value D1 is maintained constant. As a result, relative value E2 is substantially zero in the period between time t13 and time t14.

While detected value D1 from electrostatic sensor 22 is greater than or equal to auxiliary reference value Rf2, determiner 21 suspends updating auxiliary reference value Rf2. In the example illustrated in FIG. 8, detected value D1 from electrostatic sensor 22 is substantially equal to auxiliary reference value Rf2 at time t13, and auxiliary reference value Rf2 is not updated temporarily and is maintained constant in the period between time t13 and time t17.

At time t14, the user increases the pressing force again to provide the next operation input. As a result, the electrostatic capacitance starts to increase again, and detected value D1 also starts to increase.

When detected value D1 output by electrostatic sensor 22 is greater than auxiliary reference value Rf2, determiner 21 compares detected value D1 that has been output and auxiliary reference value Rf2, and determines whether movable contact B1 has been pressed. This means that determiner 21 outputs, to the outside, various control signals corresponding to the magnitude of relative value E2. Determiner 21 compares the magnitude of relative value E2 and a plurality of threshold values (for example, the first threshold value to the third threshold value described in the basic example), estimates a situation of pressing from the user, and inputs an estimation result to controller 20. Controller 20 outputs a control signal corresponding to the estimation result.

To explain with a specific example, when the magnitude of relative value E2 is greater than or equal to the first threshold value, but less than the second threshold value (corresponding to the period between time t15 and time t16, for example), determiner 21 estimates that the situation of pressing is "touching (light pressing)", and controller 20 outputs the first control signal corresponding to "touching". When the magnitude of relative value E2 is less than the first threshold value (corresponding to the period between time t12 and time t15, for example), determiner 21 estimates that there is "no pressing", and controller 20 does not output control signals.

Determiner 21 may use difference Δc between detected value D1 from electrostatic sensor 22 and auxiliary reference value Rf2 (refer to FIG. 8) directly as relative value E2. Note that difference Δc is likely to be smaller than the difference between detected value D1 and reference value Rf1. Therefore, in order to improve the reliability of the comparison and the determination, it is preferable that determiner 21 use, as relative value E2, a corrected value (Δc×k) obtained by multiplying difference Δc by arbitrary coefficient k (greater than 1). In this case, determiner 21 compares the magnitude of relative value E2 (Δc×k) with the plurality of threshold values and estimates the situation of pressing from the user. It is assumed that coefficient k is "auxiliary reference value Rf2 divided by reference value Rf1" as one example, but this is not limiting.

In the period between time t15 and time t16, the electrostatic capacitance stops increasing and detected value D1 is maintained constant due to the momentary stop of the movement of the fingertip. As a result, relative value E2 is also constant in the period between time t15 and time t16.

At time t16, the fingertip starts separating from input device 100. The electrostatic capacitance decreases with a decrease in the pressing from the user and as a result, detected value D1 also decreases toward reference value Rf1.

At time t17, detected value D1 reaches auxiliary reference value Rf2 that has not been updated temporarily and furthermore, falls below this value. As a result, determiner 21 resumes updating auxiliary reference value Rf2.

At time t18, detected value D1 from electrostatic sensor 22 falls within the predetermined range including reference value Rf1. As a result, determiner 21 completes the comparison between detected value D1 and auxiliary reference value Rf2. Instead, after time t18, determiner 21 determines the situation of pressing by comparing detected value D1 and reference value Rf1.

At time t19, new operation input is started, and relative value E1 which is the difference between detected value D1 and reference value Rf1 starts increasing.

In this manner, with the configuration according to the present variation, even when the next pressing is continuously provided in the middle of the process in which the fingertip is separating from input device 100 during the recovery operation of electrostatic sensor 22, it is possible to make an accurate determination on that pressing. This results in improved usability for a user who operates input device 100.

(3.2) Variation 2

Hereinafter, Variation 2 of input system 1 will be described with reference to FIG. 9. In the following description, in Variation 2, structural elements that are substantially the same as those in the basic example will be assigned the same reference marks and description thereof may be omitted as appropriate.

In the basic example, clicking part 51 of tactile feedback member 50 which includes two metal plates 501, 502 (metal domes) buckles to directly contact third electrode 13 and fourth electrode 14.

Figure 9:
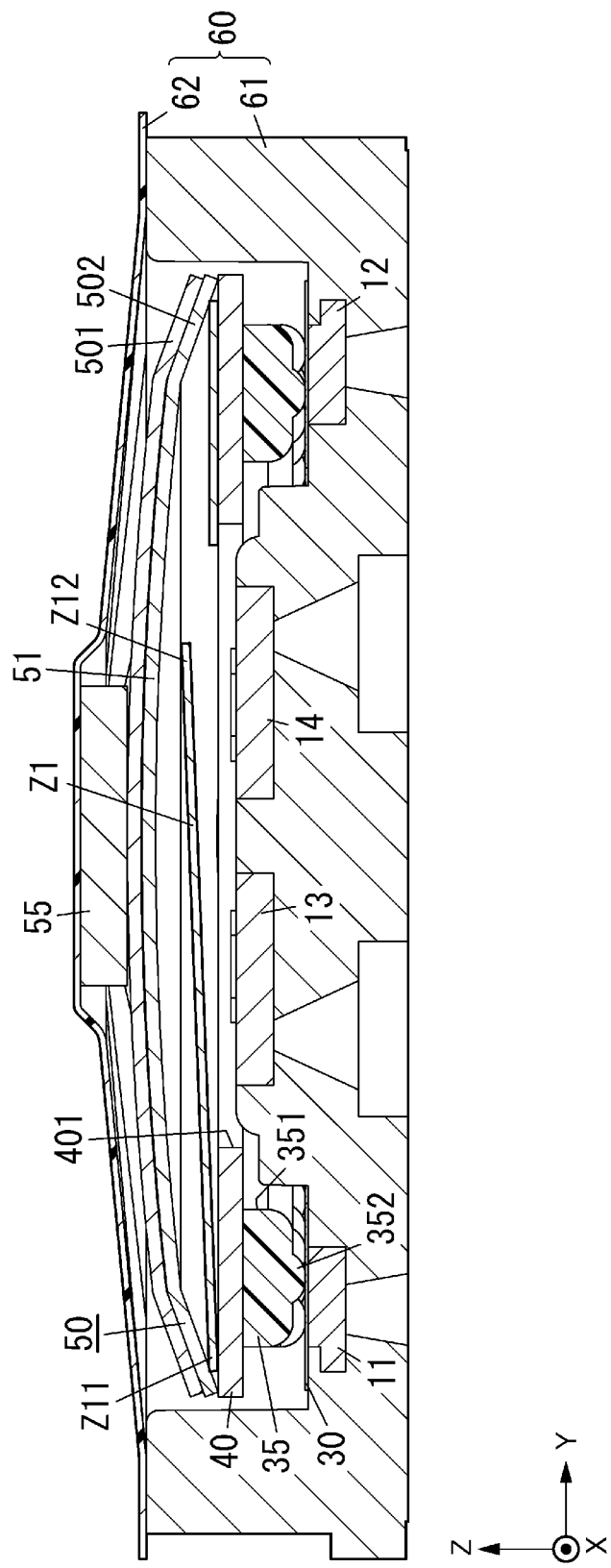
FIG. 9 is a cross-sectional view of a variation of the input device.

Input system 1 according to the present variation is different from that in the basic example in that input system 1 according to the present variation further includes movable member Z1 for conduction, as illustrated in FIG. 9.

Movable member Z1 is electrically conductive. For example, movable member Z1 is a metal leaf spring. Movable member Z1 has fixed end Z11 on the negative side of the Y axis and free end Z12 on the opposite side (on the positive side of the Y axis). Movable member Z1 is disposed between movable plate 40 and tactile feedback member 50. For example, movable member Z1 is fixed onto movable plate 40.

Clicking part 51 of tactile feedback member 50 receives pressure and thus contacts movable member Z1. When clicking part 51 is further pressed downward to buckle, a portion of movable member Z1 on the free end Z12 side bends downward and a central portion thereof contacts both third electrode 13 and fourth electrode 14. As a result, third electrode 13 and fourth electrode 14 conduct electricity therebetween movable member Z1.

As the pressing force is reduced, clicking part 51 that has buckled returns elastically; accordingly, free end Z12 also returns elastically. As a result, movable member Z1 separates from third electrode 13 and fourth electrode 14, and third electrode 13 and fourth electrode 14 return to the non-conducting state.

In this manner, with the configuration according to the present variation, providing movable member Z1 allows third electrode 13 and fourth electrode 14 to be more reliably switched between the conduction and the non-conduction as compared to the configuration in which clicking part 51 that buckles directly contacts third electrode 13 and fourth electrode 14 as in the basic example.

(3.3) Other Variations

In the basic example, immediately after conduction sensor 23 detects the undoing of the conduction, controller 20 switches the sensing operation of electrostatic sensor 22 from the OFF state to the ON state. However, it is not essential that the sensing operation of electrostatic sensor 22 be switched to the ON state immediately after the undoing of the conduction. Controller 20 may switch the sensing operation to the ON state when a relatively long period of time (for example, at least a few seconds) has elapsed since the undoing of the conduction.

Furthermore, controller 20 may switch the sensing operation of electrostatic sensor 22 from the OFF state to the ON state immediately after conduction sensor 23 detects the conduction between third electrode 13 and fourth electrode 14. The time "immediately after" detection of the conduction is defined, for example, as a point in time at which one-half of the period of clock pulses that are output in a constant cycle from an oscillator or a clock pulse generation circuit included in controller 20 to an integral multiple of the one-half of the period (for example, less than 1 millisecond) has elapsed since the timing of detection of the conduction. In this case, the sensing operation of electrostatic sensor 22 is started more quickly, thus leading to improved usability for users.

(4) Summary

As described above, an input system (1) according to the first aspect includes an input device (100), an electrostatic sensor (22), a conduction sensor (23), a controller (20), and a determiner (21). The input device (100) includes a movable contact (B1), a first electrode (11), a second electrode (12), a third electrode (13), and a fourth electrode (14). The electrostatic sensor (22) is connected to the first electrode (11). The conduction sensor (23) is connected to the third electrode (13). The controller (20) is configured to switch a sensing operation of the electrostatic sensor (22) between an ON state and an OFF state. The determiner (21) is connected to the electrostatic sensor (22) and is configured to determine, based on output from the electrostatic sensor (22), whether the movable contact (B1) is pressed. When the movable contact (B1) of the input device (100) is pressed, electrostatic capacitance between the first electrode (11) and the second electrode (12) changes, and when the movable contact (B1) of the input device (100) is further pressed after the electrostatic capacitance changes, the third electrode (13) and the fourth electrode (14) are electrically conductive to each other. The conduction sensor (23) detects the conduction between the third electrode (13) and the fourth electrode (14). The controller (20) switches the sensing operation of the electrostatic sensor (22) from the OFF state to the ON state after the conduction sensor (23) detects the conduction between the third electrode (13) and the fourth electrode (14). In the ON state, the electrostatic sensor (22) outputs a detected value (D1) related to the electrostatic capacitance between the first electrode (11) and the second electrode (12). The detected value (D1) output by the electrostatic sensor (22) is input to the determiner (21).

According to this aspect, the controller (20) switches the sensing operation of the electrostatic sensor (22) from the OFF state to the ON state after the conduction sensor (23) detects the conduction between the third electrode (13) and the fourth electrode (14). This means that the sensing operation of the electrostatic sensor (22) is maintained in the OFF state at least until the conduction sensor (23) detects the conduction. As a result, the power consumption of the electrostatic sensor (22) can be reduced.

Regarding the input system (1) according to the second aspect, in the first aspect, the controller (20) switches the sensing operation of the electrostatic sensor (22) from the OFF state to the ON state immediately after the conduction sensor (23) detects the conduction between the third electrode (13) and the fourth electrode (14).

According to this aspect, the sensing operation of the electrostatic sensor (22) is started quickly, thus leading to improved usability for a person (a user) who operates the input device (100).

Regarding the input system (1) according to the third aspect, in the first aspect, the controller (20) switches the sensing operation of the electrostatic sensor (22) from the OFF state to the ON state after the conduction sensor (23) detects the conduction between the third electrode (13) and the fourth electrode (14) and detects undoing of the conduction between the third electrode (13) and the fourth electrode (14).

This aspect leads to improved reliability related to the determination of the determiner (21) in the period between a point in time at which the conduction sensor (23) detects the conduction and a point in time at which said conduction is undone.

Regarding the input system (1) according to the fourth aspect, in the third aspect, the controller (20) switches the sensing operation of the electrostatic sensor (22) from the OFF state to the ON state immediately after the conduction sensor (23) detects the undoing of the conduction between the third electrode (13) and the fourth electrode (14).

According to this aspect, the sensing operation of the electrostatic sensor (22) is started quickly, thus leading to improved usability for a person (a user) who operates the input device (100).

Regarding the input system (1) according to the fifth aspect, in any one of the first to fourth aspects, the determiner (21) includes storage (21A) configured to storage a reference value (Rf1). The determiner (21) compares the reference value (Rf1) and the detected value (D1) output by the electrostatic sensor (22) and determines whether the movable contact (B1) has been pressed.

According to this aspect, using the reference value (Rf1) stored in the storage (21A), pressing is determined from the difference (the relative value) between the detected value (D1) and the reference value (Rf1), thus leading to improved reliability related to the determination of the determiner (21).

Regarding the input system (1) according to the sixth aspect, in the fifth aspect, the controller (20) switches the sensing operation of the electrostatic sensor (22) from the OFF state to the ON state and then to the OFF state. The controller (20) subsequently sets the reference value (Rf1) for when the sensing operation changes from the OFF state to the ON state, based on the detected value (D1) output by the electrostatic sensor (22) before the sensing operation is switched from the ON state to the OFF state.

According to this aspect, reliability related to the determination of the determiner (21) further improves as compared to the case where the detected value (D1) at a point in time at which a pressing operation for releasing the OFF state of the sensing operation of the electrostatic sensor (22) (the recovery operation) is performed is set to the reference value (PSI) and the determination is performed, for example.

Regarding the input system (1) according to the seventh aspect, in the fifth or sixth aspect, after the controller (20) switches the sensing operation of the electrostatic sensor (22) from the OFF state to the ON state, until the detected value (D1) output by the electrostatic sensor (22) falls within a predetermined range including the reference value (Rf1), the determiner (21) determines that the movable contact (B1) has not been pressed, and after the detected value (D1) output by the electrostatic sensor (22) falls within the predetermined range including the reference value (Rf1), the determiner (21) determines whether the movable contact (B1) has been pressed.

According to this aspect, it is possible to reduce the occurrences of the movable contact (B1) being determined as being pressed in the process in which a finger or the like of a person (a user) is separating from the input device (100) when the third electrode (13) and the fourth electrode (14) conduct electricity therebetween by the pressing operation (the recovery operation) for releasing the OFF state of the sensing operation of the electrostatic sensor (22), for example. This results in improved usability for a person (a user) who operates the input device (100).

Regarding the input system (1) according to the eighth aspect, in the fifth or sixth aspect, after the controller (20) switches the sensing operation of the electrostatic sensor (22) from the OFF state to the ON state, the storage (21A) of the determiner (21) stores, as an auxiliary reference value (Rf2), the detected value (D1) output by the electrostatic sensor (22). Subsequently, until the detected value (D1) output by the electrostatic sensor (22) falls within a predetermined range including the reference value (Rf1), when the detected value (D1) output by the electrostatic sensor (22) is less than the auxiliary reference value (Rf2), the determiner (21) updates the auxiliary reference value (Rf2) in the storage (21A) to the detected value (D1) output by the electrostatic sensor (22) as a new reference. When the detected value (D1) output by the electrostatic sensor (22) is greater than the auxiliary reference value (Rf2), the determiner (21) compares the detected value (D1) output by the electrostatic sensor (22) and the auxiliary reference value (Rf2) and determines whether the movable contact (B1) has been pressed.

According to this aspect, for example, even when the next pressing is continuously provided in the middle of the process in which a fingertip or the like of a user is separating from the input device (100) during the recovery operation for releasing the OFF state of the sensing operation of the electrostatic sensor (22), it is possible to make an accurate determination on that pressing. This results in improved usability for a person (a user) who operates the input device (100).

A control method according to the ninth aspect is a control method for an input system (1). The input system (1) includes an input device (100), an electrostatic sensor (22), a conduction sensor (23), a controller (20), and a determiner (21). The input device (100) includes a movable contact (B1), a first electrode (11), a second electrode (12), a third electrode (13), and a fourth electrode (14). The electrostatic sensor (22) is connected to the first electrode (11). The conduction sensor (23) is connected to the third electrode (13). The controller (20) is configured to switch a sensing operation of the electrostatic sensor (22) to an ON state or an OFF state. The determiner (21) is connected to the electrostatic sensor (22) and is configured to determine, based on output from the electrostatic sensor (22), whether the movable contact (B1) has been pressed. When the movable contact (B1) of the input device (100) is pressed, electrostatic capacitance between the first electrode (11) and the second electrode (12) changes, when the movable contact (B1) of the input device (100) is further pressed after the electrostatic capacitance changes, the third electrode (13) and the fourth electrode (14) are electrically conductive to each other. The control method includes the step of detecting conduction, the step of switching, the step of detecting electrostatic capacitance, and the step of inputting. In the step of detecting conduction, the controller (20) causes the conduction sensor (23) to detect conduction between the third electrode (13) and the fourth electrode (14). In the step of switching, the controller (20) switches the sensing operation of the electrostatic sensor (22) from the OFF state to the ON state after the conduction sensor (23) detects the conduction between the third electrode (13) and the fourth electrode (14). In the step of detecting electrostatic capacitance, the controller (20) causes the electrostatic sensor (22) to output a detected value (D1) related to the electrostatic capacitance between the first electrode (11) and the second electrode (12) after switching the sensing operation of the electrostatic sensor (22) from the OFF state to the ON state. In the step of inputting, the controller (20) causes the detected value (D1) output by the electrostatic sensor (22) to be input to the determiner (21).

According to this aspect, it is possible to provide a control method in which the power consumption of the electrostatic sensor (22) can be reduced.

Regarding the control method according to the tenth aspect, in the ninth aspect, in the step of switching, the controller (20) switches the sensing operation of the electrostatic sensor (22) from the OFF state to the ON state immediately after the conduction between the third electrode (13) and the fourth electrode (14) is detected.

According to this aspect, the sensing operation of the electrostatic sensor (22) is started quickly, thus leading to improved usability for a person (a user) who operates the input device (100).

Regarding the control method according to the eleventh aspect, in the ninth aspect, in the step of switching, the controller (20) switches the sensing operation of the electrostatic sensor (22) from the OFF state to the ON state after the conduction sensor (23) detects the conduction between the third electrode (13) and the fourth electrode (14) and then detects undoing of the conduction between the third electrode (13) and the fourth electrode (14).

This aspect leads to improved reliability related to the determination of the determiner (21) in the period between a point in time at which the conduction sensor (23) detects the conduction and a point in time at which said conduction is undone.

The configurations corresponding to the second to eighth aspects are not essential to the input system (1) and can be omitted as appropriate. The methods according to the tenth and eleventh aspects are not essential to the control method for the input system (1) and can be omitted as appropriate.

REFERENCE MARKS IN THE DRAWINGS 1 input system
100 input device
B1 movable contact
11 first electrode
12 second electrode
13 third electrode
14 fourth electrode
20 controller
21 determiner
21A storage
22 electrostatic sensor
23 conduction sensor
D1 detected value
Rf1 reference value
Rf2 auxiliary reference value

The invention claimed is:

1. An input system comprising:
an input device including a movable contact, a first electrode, a second electrode, a third electrode, and a fourth electrode;
an electrostatic sensor connected to the first electrode;
a conduction sensor connected to the third electrode and configured to detect electrical conduction and non-conduction between the third electrode and the fourth electrode;
a controller configured to switch a sensing operation of the electrostatic sensor between an ON state and an OFF state; and
a determiner connected to the electrostatic sensor, wherein;
the input device is configured such that, when the movable contact is pressed, electrostatic capacitance between the first electrode and the second electrode changes,
the input device is configured such that, when the movable contact is further pressed after the electrostatic capacitance changes, the third electrode and the fourth electrode are electrically conductive to each other, and after the third electrode and the fourth electrode become electrically conductive to each other, the third electrode and the fourth electrode are electrically non-conductive from each other,
the controller causes the sensing operation of the electrostatic sensor to be in the OFF state before the movable contact is pressed and maintains the OFF state until the conduction sensor detects the conduction between the third electrode and the fourth electrode and subsequently detects the non-conduction between the third electrode and the fourth electrode,
after the conduction sensor detects the conduction between the third electrode and the fourth electrode and subsequently detects the non-conduction between the third electrode and the fourth electrode, the controller switches the sensing operation of the electrostatic sensor from the OFF state to the ON state,
in the ON state, the electrostatic sensor outputs a detected value related to the electrostatic capacitance between the first electrode and the second electrode,
the detected value output by the electrostatic sensor is input to the determiner, and
the determiner determines, based on the detected value output from the electrostatic sensor, whether the movable contact has been pressed.

2. The input system according to claim 1, wherein
the controller switches the sensing operation of the electrostatic sensor from the OFF state to the ON state immediately after the conduction sensor detects the non-conduction between the third electrode and the fourth electrode.

3. The input system according to claim 1, wherein
the determiner includes storage configured to store a reference value, compares the reference value and the detected value output by the electrostatic sensor, and determines whether the movable contact has been pressed.

4. The input system according to claim 3, wherein
the controller switches the sensing operation of the electrostatic sensor from the OFF state to the ON state and then to the OFF state, and
subsequently, the reference value for when the sensing operation changes from the OFF state to the ON state is set based on the detected value output by the electrostatic sensor before the sensing operation is switched from the ON state to the OFF state.

5. The input system according to claim 3, wherein
after the controller switches the sensing operation of the electrostatic sensor from the OFF state to the ON state,
until the detected value output by the electrostatic sensor falls within a predetermined range including the reference value, the determiner determines that the movable contact has not been pressed, and
after the detected value output by the electrostatic sensor falls within the predetermined range including the reference value, the determiner determines whether the movable contact has been pressed.

6. The input system according to claim 3, wherein
after the controller switches the sensing operation of the electrostatic sensor from the OFF state to the ON state,
the storage of the determiner stores, as an auxiliary reference value, the detected value output by the electrostatic sensor,
subsequently, until the detected value output by the electrostatic sensor falls within a predetermined range including the reference value,
when the detected value output by the electrostatic sensor is less than the auxiliary reference value, the determiner updates the auxiliary reference in the storage to the detected value output by the electrostatic sensor as a new auxiliary reference, and
when the detected value output by the electrostatic sensor is greater than the auxiliary reference value, the determiner compares the detected value output by the electrostatic sensor and the auxiliary reference value and determines whether the movable contact has been pressed.

7. A control method for an input system, wherein the input system includes:
an input device including a movable contact, a first electrode, a second electrode, a third electrode, and a fourth electrode;
an electrostatic sensor connected to the first electrode;
a conduction sensor connected to the third electrode and configured to detect electrical conduction and non-conduction between the third electrode and the fourth electrode; and
a controller configured to switch a sensing operation of the electrostatic sensor to an ON state or an OFF state;
when the movable contact is pressed, electrostatic capacitance between the first electrode and the second electrode changes, and when the movable contact the input device is further pressed after the electrostatic capacitance changes, the third electrode and the fourth electrode are electrically conductive to each other, and
the control method comprises:
causing the sensing operation of the electrostatic sensor to be in the OFF state before the movable contact is pressed and maintains the OFF state until the conduction sensor detects the conduction between the third electrode and the fourth electrode and subsequently detects the non-conduction between the third electrode and the fourth electrode;
switching, by the controller, the sensing operation of the electrostatic sensor from the OFF state to the ON state after the conduction sensor detects the conduction between the third electrode and the fourth electrode and subsequently detects the non-conduction between the third electrode and the fourth electrode;
causing, by the controller, the electrostatic sensor to output a detected value related to the electrostatic capacitance between the first electrode and the second electrode after switching the sensing operation of the electrostatic sensor from the OFF state to the ON state; and
determining, based on the detected value output from the electrostatic sensor, whether the movable contact has been pressed.

8. The control method according to claim 7, wherein in the switching, the controller switches the sensing operation of the electrostatic sensor from the OFF state to the ON state immediately after the non-conduction between the third electrode and the fourth electrode is detected.

9. An input system comprising:
an input device including a movable contact, a first electrode, a second electrode, a third electrode, and a fourth electrode;
an electrostatic sensor connected to the first electrode;
a conduction sensor connected to the third electrode and configured to detect electrical conduction and non-conduction between the third electrode and the fourth electrode; and
a controller configured to switch a sensing operation of the electrostatic sensor between an ON state and an OFF state, wherein:
the input device is configured such that, when the movable contact is pressed, electrostatic capacitance between the first electrode and the second electrode changes,
the input device is configured such that, when the movable contact is further pressed after the electrostatic capacitance changes, the third electrode and the fourth electrode are electrically conductive to each other, and after the third electrode and the fourth electrode become electrically conductive to each other, the third electrode and the fourth electrode are electrically non-conductive from each other,
the controller causes the sensing operation of the electrostatic sensor to be in the OFF state before the movable contact is pressed and maintains the OFF state until the conduction sensor detects the conduction between the third electrode and the fourth electrode and subsequently detects the non-conduction between the third electrode and the fourth electrode, and
after the conduction sensor detects the conduction between the third electrode and the fourth electrode and subsequently detects the non-conduction between the third electrode and the fourth electrode, the controller switches the sensing operation of the electrostatic sensor from the OFF state to the ON state.

10. The input system according to claim 9, further comprising:
a determiner connected to the electrostatic sensor,
wherein the determiner determines, based on the detected value output from the electrostatic sensor, whether the movable contact has been pressed.

11. An input system comprising:
an input device including a movable contact, a first electrode, a second electrode, a third electrode, and a fourth electrode;
an electrostatic sensor connected to the first electrode;
a conduction sensor connected to the third electrode;
a controller configured to switch a sensing operation of the electrostatic sensor between an ON state and an OFF state; and
a determiner connected to the electrostatic sensor and configured to determine, based on output from the electrostatic sensor, whether the movable contact is pressed, wherein:
when the movable contact of the input device is pressed, electrostatic capacitance between the first electrode and the second electrode changes,
when the movable contact of the input device is further pressed after the electrostatic capacitance changes, the third electrode and the fourth electrode are electrically conductive to each other,
the conduction sensor detects the conduction between the third electrode and the fourth electrode,
after the conduction sensor detects the conduction between the third electrode and the fourth electrode, the controller switches the sensing operation of the electrostatic sensor from the OFF state to the ON state,
in the ON state, the electrostatic sensor outputs a detected value related to the electrostatic capacitance between the first electrode and the second electrode,
the detected value output by the electrostatic sensor is input to the determiner,
the determiner includes storage configured to store a reference value, compares the reference value and the detected value output by the electrostatic sensor, and determines whether the movable contact has been pressed,
the controller switches the sensing operation of the electrostatic sensor from the OFF state to the ON state and then to the OFF state, and subsequently, the reference value for when the sensing operation changes from the OFF state to the ON state is set based on the detected value output by the electrostatic sensor before the sensing operation is switched from the ON state to the OFF state.

12. The input system according to claim 11, wherein
the controller switches the sensing operation of the electrostatic sensor from the OFF state to the ON state immediately after the conduction sensor detects the conduction between the third electrode and the fourth electrode.

13. The input system according to claim 12, wherein:
after the controller switches the sensing operation of the electrostatic sensor from the OFF state to the ON state,
until the detected value output by the electrostatic sensor falls within a predetermined range including the reference value, the determiner determines that the movable contact has not been pressed, and
after the detected value output by the electrostatic sensor falls within the predetermined range including the reference value, the determiner determines whether the movable contact has been pressed.

14. The input system according to claim 12, wherein:
after the controller switches the sensing operation of the electrostatic sensor from the OFF state to the ON state,
the storage of the determiner stores, as an auxiliary reference value, the detected value output by the electrostatic sensor,
subsequently, until the detected value output by the electrostatic sensor falls within a predetermined range including the reference value,
when the detected value output by the electrostatic sensor is less than the auxiliary reference value, the determiner updates the auxiliary reference in the storage to the detected value output by the electrostatic sensor as a new auxiliary reference, and
when the detected value output by the electrostatic sensor is greater than the auxiliary reference value, the determiner compares the detected value output by the electrostatic sensor and the auxiliary reference value and determines whether the movable contact has been pressed.

15. An input system comprising:
an input device including a movable contact, a first electrode, a second electrode, a third electrode, and a fourth electrode;
an electrostatic sensor connected to the first electrode;
a conduction sensor connected to the third electrode;
a controller configured to switch a sensing operation of the electrostatic sensor between an ON state and an OFF state; and
a determiner connected to the electrostatic sensor and configured to determine, based on output from the electrostatic sensor, whether the movable contact is pressed, wherein:
when the movable contact of the input device is pressed, electrostatic capacitance between the first electrode and the second electrode changes,
when the movable contact of the input device is further pressed after the electrostatic capacitance changes, the third electrode and the fourth electrode are electrically conductive to each other,
the conduction sensor detects the conduction between the third electrode and the fourth electrode,
after the conduction sensor detects the conduction between the third electrode and the fourth electrode, the controller switches the sensing operation of the electrostatic sensor from the OFF state to the ON state,
in the ON state, the electrostatic sensor outputs a detected value related to the electrostatic capacitance between the first electrode and the second electrode,
the detected value output by the electrostatic sensor is input to the determiner,
the determiner includes storage configured to store a reference value, compares the reference value and the detected value output by the electrostatic sensor, and determines whether the movable contact has been pressed,
after the controller switches the sensing operation of the electrostatic sensor from the OFF state to the ON state,
the storage of the determiner stores, as an auxiliary reference value, the detected value output by the electrostatic sensor,
subsequently, until the detected value output by the electrostatic sensor falls within a predetermined range including the reference value,
when the detected value output by the electrostatic sensor is less than the auxiliary reference value, the determiner updates the auxiliary reference in the storage to the detected value output by the electrostatic sensor as a new auxiliary reference, and
when the detected value output by the electrostatic sensor is greater than the auxiliary reference value, the determiner compares the detected value output by the electrostatic sensor and the auxiliary reference value and determines whether the movable contact has been pressed.

16. The input system according to claim 15, wherein
the controller switches the sensing operation of the electrostatic sensor from the OFF state to the ON state immediately after the conduction sensor detects the conduction between the third electrode and the fourth electrode.

* * * * *